US008327890B2

(12) United States Patent
Mackrill et al.

(10) Patent No.: US 8,327,890 B2
(45) Date of Patent: Dec. 11, 2012

(54) MODULAR BAG FILLING APPARATUS

(75) Inventors: Don Mackrill, Richmond Hill (CA); Bahram Zandi-Hanjari, Thornhill (CA)

(73) Assignee: Control and Metering Limited, Mississauga, Ontario (CA)

( * ) Notice: Subject to any disclaimer, the term of this patent is extended or adjusted under 35 U.S.C. 154(b) by 786 days.

(21) Appl. No.: 11/991,668

(22) PCT Filed: Sep. 8, 2006

(86) PCT No.: PCT/CA2006/001478
§ 371 (c)(1),
(2), (4) Date: Aug. 17, 2009

(87) PCT Pub. No.: WO2007/028251
PCT Pub. Date: Mar. 15, 2007

(65) Prior Publication Data
US 2009/0293990 A1 Dec. 3, 2009

(30) Foreign Application Priority Data

Sep. 9, 2005 (CA) .................................... 2518652
Feb. 3, 2006 (CA) .................................... 2535256

(51) Int. Cl.
*B65B 1/04* (2006.01)
(52) U.S. Cl. ........................... 141/315; 141/83; 141/314
(58) Field of Classification Search ............... 141/83, 141/314–317; 177/160
See application file for complete search history.

(56) References Cited

U.S. PATENT DOCUMENTS

| | | | | |
|---|---|---|---|---|
| 3,416,620 A * | 12/1968 | McClusky | ................ | 177/123 |
| 4,676,284 A * | 6/1987 | DeCrane | ................ | 141/114 |
| 4,688,371 A * | 8/1987 | Hecht | ................ | 53/502 |
| 4,703,782 A * | 11/1987 | Henkel, Sr. | ................ | 141/65 |
| 4,718,464 A * | 1/1988 | Delves et al. | ................ | 141/75 |
| 4,883,201 A | 11/1989 | Poulton | | |
| 4,946,071 A | 8/1990 | Poulton | | |
| 4,998,991 A | 3/1991 | Poulton | | |
| 5,033,706 A | 7/1991 | Poulton | | |

(Continued)

OTHER PUBLICATIONS

ALMCORP Advertisement from Powder and Bulk Engineering, Aug. 2004, 1 page.

(Continued)

*Primary Examiner* — Timothy L Maust
(74) *Attorney, Agent, or Firm* — Hudak, Shunk & Farine Co. LPA

(57) ABSTRACT

A bulk bag filling apparatus comprises a first support member having an upper end and a lower end and being oriented in a generally vertical direction; a second support member connected to said generally vertical member and extending at an angle to said generally vertical direction; a filling head for engagement with an opening of the bulk bag, wherein the filling head is connected to and supported by the second support member; a bulk bag support structure for engagement with support elements of the bulk bag, wherein the bulk bag support structure is connected to and supported by the second support member; and a hang-weighing mechanism for weighing the contents of the bulk bag, wherein the bulk bag support structure is connected to said second support member through said hang-weighing mechanism. The hang-weighing apparatus includes one or two load-bearing points at which the bulk bag support structure applies a load to the hang-weighing apparatus. A load cell is preferably provided at each of said load-bearing points, wherein each of said load cells converts said load into an electrical signal representative of the weight of the bulk bag and its contents.

32 Claims, 16 Drawing Sheets

U.S. PATENT DOCUMENTS

| | | | |
|---|---|---|---|
| 5,036,893 A * | 8/1991 | DeCrane | 141/114 |
| 5,056,571 A * | 10/1991 | Derby | 141/114 |
| 5,259,425 A * | 11/1993 | Johnson et al. | 141/12 |
| 5,320,251 A | 6/1994 | Ellis | |
| 5,322,195 A | 6/1994 | Ellis | |
| 5,336,853 A | 8/1994 | Davidson | |
| 5,341,959 A | 8/1994 | Ellis | |
| 5,400,837 A | 3/1995 | Kelley et al. | |
| 5,657,801 A | 8/1997 | Ellis | |
| 5,787,945 A | 8/1998 | Riemersma | |
| 6,089,283 A * | 7/2000 | Sienerth et al. | 141/75 |
| 6,112,504 A * | 9/2000 | McGregor et al. | 53/417 |
| 6,149,110 A * | 11/2000 | Gill et al. | 248/95 |
| 6,227,408 B1 | 5/2001 | Poulton | |
| 6,564,534 B2 | 5/2003 | Poulton et al. | |
| 6,769,857 B2 | 8/2004 | Nyhof | |
| 6,776,197 B1 * | 8/2004 | DeCrane | 141/10 |
| 7,004,212 B2 | 2/2006 | Gill et al. | |
| 7,063,493 B2 * | 6/2006 | Pfeiffer et al. | 414/412 |
| 7,165,498 B2 | 1/2007 | Mackrill et al. | |
| 7,267,144 B2 * | 9/2007 | Nyhof et al. | 141/314 |
| 2003/0206790 A1 | 11/2003 | Nyhof | |
| 2003/0217528 A1 | 11/2003 | Wilson | |
| 2005/0022700 A1 | 2/2005 | Mackrill et al. | |
| 2005/0199650 A1 | 9/2005 | Nyhof et al. | |
| 2005/0217754 A1 | 10/2005 | Gill et al. | |
| 2005/0241728 A1 | 11/2005 | Nyhof et al. | |

OTHER PUBLICATIONS

ALMCORP, Product Pages obtained from www.almcorp.com on Aug. 17, 2005, 2 pages.

Flomat Bagfilla International Ltd., Drawing No. B1415-204, Aug. 2002, 1 page.

Flomat Bagfilla International Ltd., Drawing No. B1415-200, Jul. 2002, 1 page.

IBC International Handling AB, IBC Bagmaster Junior Type III, undated, 2 pages.

* cited by examiner

MODULAR BAG FILLING APPARATUS

FIELD OF THE INVENTION

The invention relates to an apparatus for filling bulk bags, and specifically to such an apparatus having a simplified, modular construction.

BACKGROUND OF THE INVENTION

The filling of bulk bags, also known as flexible intermediate bulk containers or "FIBCs" is typically accomplished by a filling machine having means for hanging the bag and connecting the bag to the nozzle of a discharge apparatus. In addition, the filling machine may be provided with means for weighing the bag as it is being filled, means for raising and lowering the bag, means for vibrating and compacting the contents of the bag during filling, and means for controlling discharge of particulate material into the atmosphere during filling of the bag. Bag filling machines incorporating one or more of these features are disclosed in U.S. Pat. No. 6,564,534 (Poulton et al.), U.S Pat. No. 5,336,853 (Davidson) and U.S. Pat. No. 4,718,464 (Delves et al.).

One disadvantage of existing bag filling machines is that they are not easily adapted to suit the varying needs of users. For example, some users may not require means for vibrating the bag or weighing the bag and its contents, whereas other users may require a filling machine having all of the above features. In general, the inventors have found that it is difficult or impossible to retrofit additional components onto most existing bag filling machines. Likewise, it may be difficult to eliminate components which are not required by a specific user. This not only limits the range of choices available to the user, but can increase cost due to the fact that it may be necessary to design a separate filling machine for each application. Furthermore, a user wishing to upgrade to a filling machine having enhanced features will be forced to purchase a new machine where retrofitting the additional components is not possible.

The inventors have also found that many filling machines employ weighing mechanisms which are unnecessarily complex. This can result in poor reliability and high cost. There remains a need for simpler, more robust filling machines which are preferably of modular construction in order to meet the varying needs of filling machine users.

SUMMARY OF THE INVENTION

The present invention provides a bulk bag filling apparatus, comprising: (a) a first support member having an upper end and a lower end and being oriented in a generally vertical direction; (b) a second support member connected to said generally vertical member and extending at an angle to said generally vertical direction; (c) a filling head for engagement with an opening of the bulk bag, wherein the filling head is connected to and supported by the second support member; (d) a bulk bag support structure for engagement with support elements of the bulk bag, wherein the bulk bag support structure is connected to and supported by the second support member; and (e) a hang-weighing mechanism for weighing the contents of the bulk bag, wherein the bulk bag support structure is connected to said second support member through said hang-weighing mechanism.

In one aspect the invention provides that the hang-weighing apparatus includes one or two load-bearing points at which the bulk bag support structure applies a load to the hang-weighing apparatus.

In another aspect the invention provides that a load cell is provided at each of said load-bearing points, wherein each of said load cells converts said load into an electrical signal representative of the weight of the bulk bag and its contents.

In yet another aspect the invention the apparatus further comprises a filling head support structure to which the filling head is connected, wherein both the filling head and the filling head support structure are connected to and supported by the second support member.

In yet another aspect the invention provides that the filling head support structure comprises a frame structure connected to an end of the second support member which is distal to said first support member, and wherein the filling head is rigidly secured to said frame structure.

In yet another aspect the invention provides that the frame structure comprises a framework of generally horizontal members to which the filling head is secured, wherein the filling head comprises a pair of concentric cylinders separated by an annular space.

In yet another aspect the invention provides that the bulk bag support structure comprises a pair of parallel hanger arms extending along either side of the filler head, and wherein the hanger arms are provided with a plurality of hangers for engaging the support elements of the bulk bag, the support elements comprising loops.

In yet another aspect the invention provides that the filling head support structure comprises a frame structure connected to an end of the second support member which is distal to said first support member, wherein the filling head is rigidly secured to said frame structure, and wherein said hang-weighing mechanism comprises a pair of hang-weighing devices, each of which is interconnected between the filling head support structure and one of the hanger arms, such that the hanger arms are suspended from the hang-weighing devices.

In yet another aspect the invention provides that the hang-weighing devices comprise load cells which are aligned with one another along a horizontal axis passing through a centre of the filling head.

In yet another aspect the invention provides that each of the hanger arms is suspended from the filling head support structure by a plate having means for adjusting the height of the hanger arms.

In yet another aspect the invention provides that each of the hanger arms is provided with two of said hangers, the hangers being located proximate to the ends of the hanger bars, wherein the hanger bars are suspended at points located approximately midway between their ends from the hang-weighing devices, and wherein a center point of the filling head is approximately equidistant between the hanger arms.

In yet another aspect the invention provides that the first support member comprises a vertical beam and the second support member comprises a projecting beam having a first end and a second end, wherein the hang-weighing mechanism comprises a single hang-weighing device through which the first end of the projecting beam is connected to the vertical beam, and wherein the second end of the projecting beam is spaced in a forward direction from the vertical beam and is connected to the filling head and the bulk bag support structure.

In yet another aspect the invention provides that the projecting beam comprises a first portion which is secured to the vertical beam and a second portion which is pivotably connected to said first portion about a pivot axis located between the first and second ends of the projecting beam.

In yet another aspect the invention provides that the hang weighing device comprises a load cell which is interconnected between the first and second portions of the projecting beam, wherein the load cell is located between the pivot axis and the first end of the projecting beam.

In yet another aspect the invention provides that the load cell is connected between a downwardly-facing surface of the first portion of the projecting beam and an upwardly-facing surface of the second portion of the projecting beam, such that application of a downward load at the second end of the projecting beam causes pivoting of the second portion of the projecting beam and results in a corresponding load being applied to the load cell.

In yet another aspect the invention provides that the second portion of the projecting beam has a first end connected to said hang-weighing device and a second end which is attached to said filling head.

In yet another aspect the invention provides that the second end of the second portion of the projecting beam is branched and is pivotably connected along a pivot axis to opposite sides of said filling head, wherein said pivot axis extends through a center of said filling head.

In yet another aspect the invention provides that the bulk bag support structure comprises four hanger arms projecting radially outwardly from said filling head in a X-shaped pattern, each of the hanger arms having a first end attached to the filling head and a second end carrying a hanger for engaging a support element of the bulk bag, wherein the support elements comprise loops.

In yet another aspect the invention provides that the filling head is provided with a pair of spaced, annular flanges between which the first ends of the hanger arms are received.

In yet another aspect the invention provides that two of said hanger arms are pivotably attached to said filling head for rotation about their first ends.

In yet another aspect the invention provides that said two pivotable hanger arms are rotatable about their first ends from a first position in which they are each angled relative to an adjacent hanger arm to a second position in which they are each approximately parallel to an adjacent hanger arm.

In yet another aspect the invention the apparatus further comprises a pair of fluid-actuated cylinders for pivoting said two pivotable hanger arms, wherein each of the fluid-actuated cylinders is attached at one end to the filling head and at another end to one of the hanger arms.

In yet another aspect the invention provides that the second support member is connected to the first support member so as to be movable along the first support member in said generally vertical direction; and wherein the apparatus further comprises a drive mechanism for moving said second support member in said generally vertical direction.

In yet another aspect the invention provides that the first support member comprises a vertical beam and the second support member comprises a projecting beam having a first end which is movably connected to the vertical beam and having a second end spaced in a forward direction from the vertical beam.

In yet another aspect the invention provides that the projecting beam is movably connected to the vertical beam by a vertically movable sleeve surrounding the vertical beam, the sleeve having a forward-facing surface on which the first end of the projecting beam is mounted.

In yet another aspect the invention provides that the angle at which the second support member extends is from about 45-90 degrees to the generally vertical direction, for example the angle may be about 60 degrees or about 90 degrees.

In yet another aspect the invention the apparatus further comprises a rotatable base on which the lower end of the first support member is mounted such that the first support member is rotatable about an axis which is parallel to said generally vertical direction.

In yet another aspect the invention provides that the rotatable base comprises a turntable mechanism.

In yet another aspect the invention provides that said second support member extends in a forward direction from said first support member, and wherein the apparatus further comprises: a third support member connected to said generally vertical member and extending at an angle to said generally vertical direction and in a direction which is generally opposite to that in which the second support member extends; a second filling head for engagement with an opening of a second bulk bag; wherein the second filling head is connected to the third support member and are supported therefrom; and a second bulk bag support structure for engagement with support elements of the second bulk bag, wherein the second bulk bag support structure is connected to the third support member and is supported therefrom.

In yet another aspect the invention provides a bulk bag filling apparatus, comprising: (a) a filling head for engagement with an opening of the bulk bag; (b) a bulk bag support structure for releasable engagement with support loops of the bulk bag, wherein the bulk bag support structure comprises a plurality of rotatable support arms, wherein each of the support arms extends along a substantially horizontal axis and has a free end onto which one of the support loops is receivable, the free end being curved in one direction; wherein each of the support arms is rotatable by at least about 180 degrees from a first position in which the curved free end is directed generally upwardly so as to retain the support loop against becoming dislodged from the support arm to a second position in which the curved free end is directed generally downwardly so as to permit the support loop to slide off the free end of the support arm.

In yet another aspect the invention provides that each of the support arms is provided with a spiral rib having a distal portion which forms said curved free end of the support arm and a proximal portion which is separated from the distal portion by a relatively flat, horizontal area having a width at least as great as that of the support loop of the bulk bag, and wherein the spiral rib is threaded in a direction opposite to a direction of rotation of the support arm so as to cause the support loop to move toward the free end of the support arm during rotation thereof.

In yet another aspect the invention provides that the free end of the support arm has a taper extending in generally the same direction as the distal portion of the spiral rib so as to encourage the support loop to slide off the free end of the support arm.

BRIEF DESCRIPTION OF THE DRAWINGS

The invention will now be described, by way of example only, with reference to the accompanying drawings in which.

DETAILED DESCRIPTION OF PREFERRED EMBODIMENTS

Figure 1:
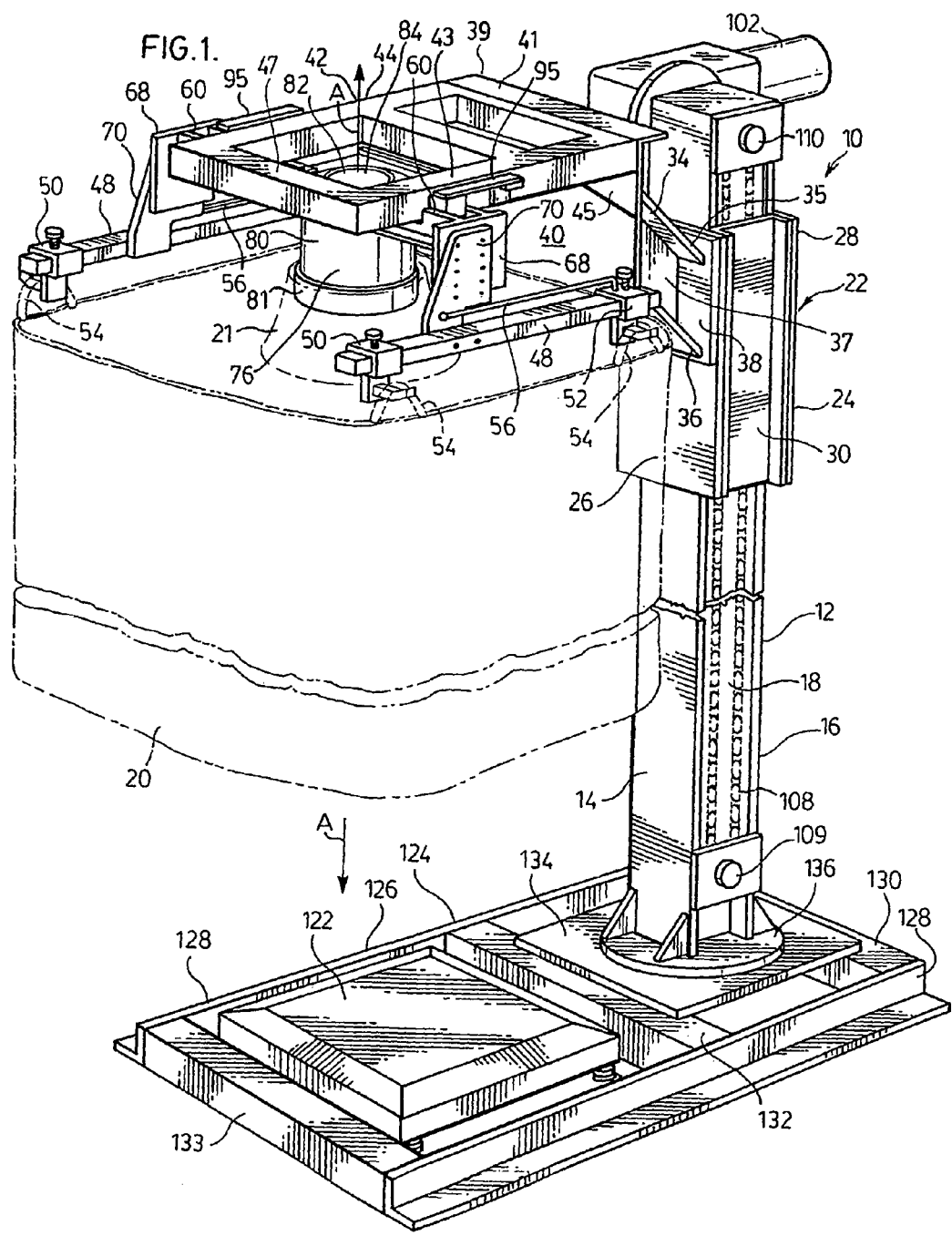
FIG. 1 is a perspective view of a bag filling apparatus according to a first embodiment of the invention, viewed from the front and the left side.

FIGS. 1 to 4 illustrate a bag filling apparatus 10 for filling a bulk bag 20 according to a first embodiment of the invention. Bag filling apparatus 10 comprises a single support post 12 extending vertically from the base to the top of the apparatus 10. The support post 12 preferably comprises a steel I-beam having parallel front and rear flanges 14, 16 connected by a web 18. Although it may be preferred to construct support post 12 from a single I-beam, it will be appreciated that post 12 could be of a different construction. For example, post 12 could be of tubular construction or may comprise two or more vertical members, for example as shown in U.S. Pat. No. 6,564,534 (Poulton et al.).

Apparatus 10 further comprises a carriage frame 22 from which the bag 20 is suspended. The carriage frame 22 comprises a rectangular sleeve 24 which surrounds the support post 12 and is mounted for reciprocal vertical movement along the support post 12. The rectangular sleeve 24 is shown as comprising a front plate 26, a rear plate 28 and a pair of side plates 30, 32. The side plates 30, 32 are connected to a drive mechanism described below, which is housed inside the cavities of the I-beam 12.

The carriage frame 22 further comprises a support arm 34 projecting from the front plate 26 of the rectangular sleeve 24. In the first embodiment, the support arm 34 comprises an I-beam having parallel upper and lower flanges 35, 36 connected by a web 37. Although the support arm 34 is shown in the drawings as comprising an I-beam, but may instead be of a different construction, for example it may be tubular. The support arm further comprises a mounting plate 38 from which it projects at an angle, for example 60 degrees to the horizontal. The mounting plate is secured to the front plate 26 of sleeve 24 by mechanical fasteners such as bolts (not shown), or by other suitable means such as welding. It will be appreciated that the support arm 34 is not necessarily angled, but may instead be horizontal.

The support arm 34 further comprises a front plate 39 having a lower vertical portion 40 and an upper horizontal portion 41 which is bent back toward the support post 12. The width of the front plate 39 is greater than the width of the upper and lower flanges 35, 36 of the support arm 34.

Figure 2:
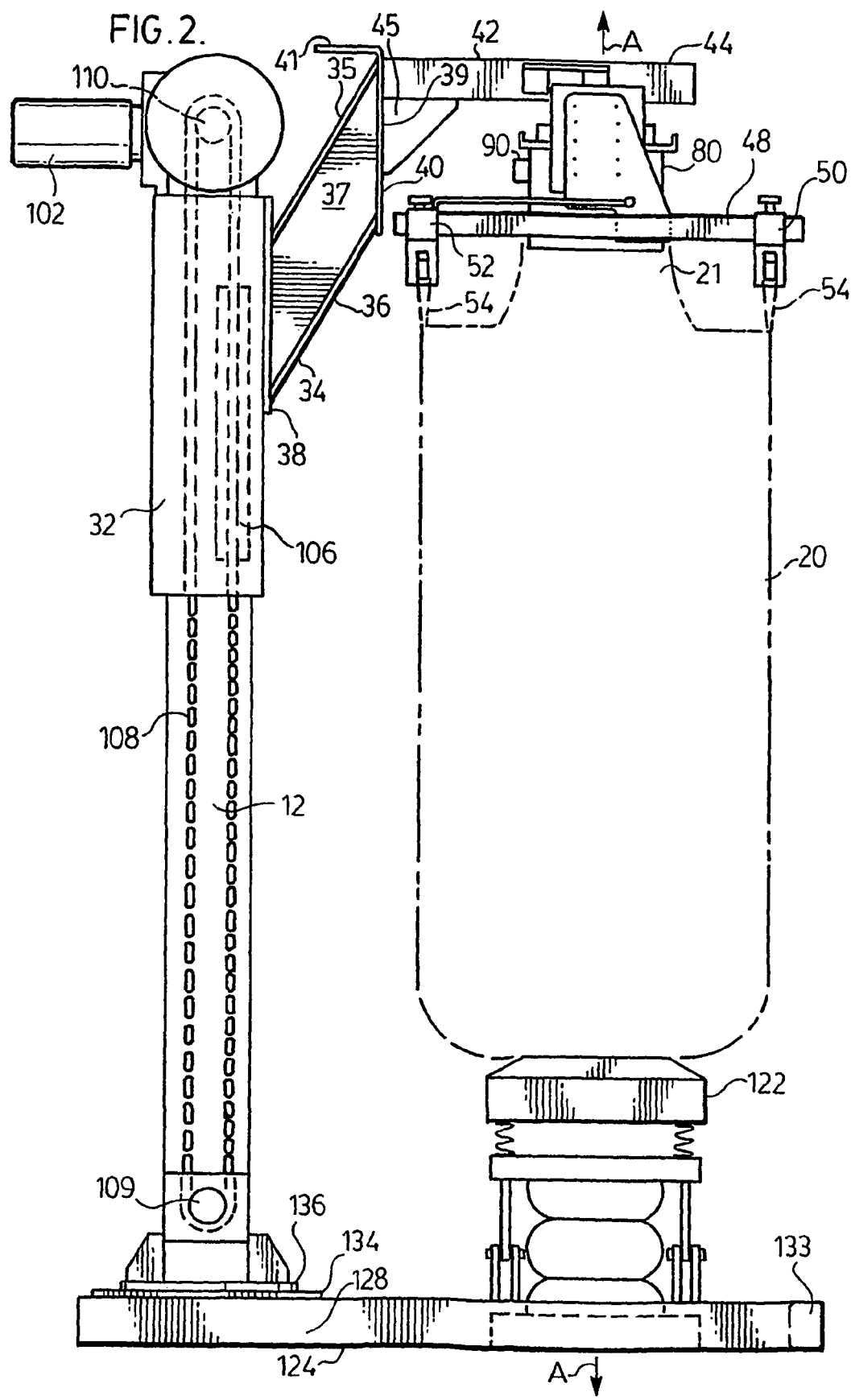
FIG. 2 is a right side elevation view thereof.
Figure 3:
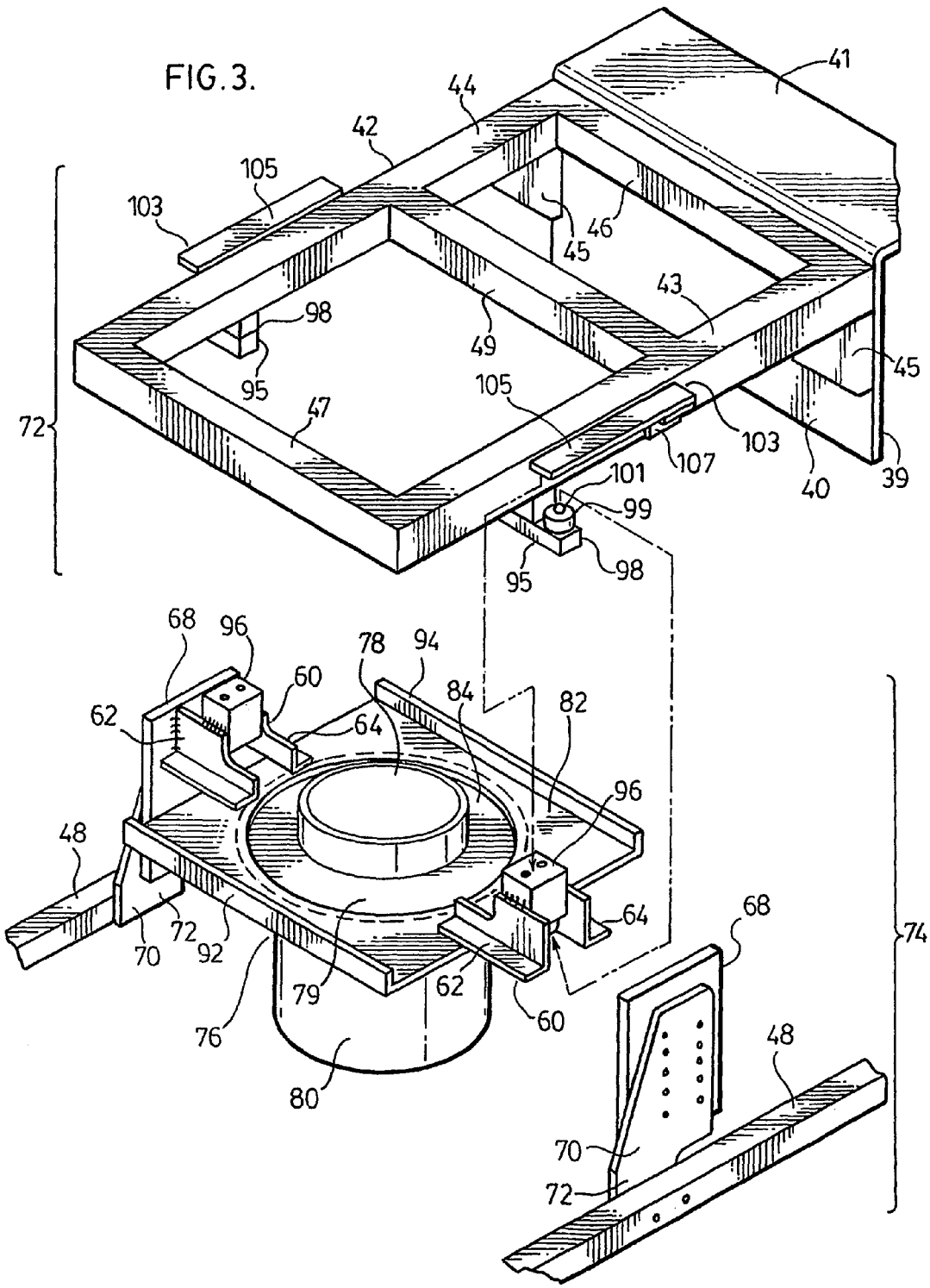
FIG. 3 is a perspective view of a portion of the carriage frame of the apparatus of FIG. 1, shown in a partially disassembled state.
Figure 4:
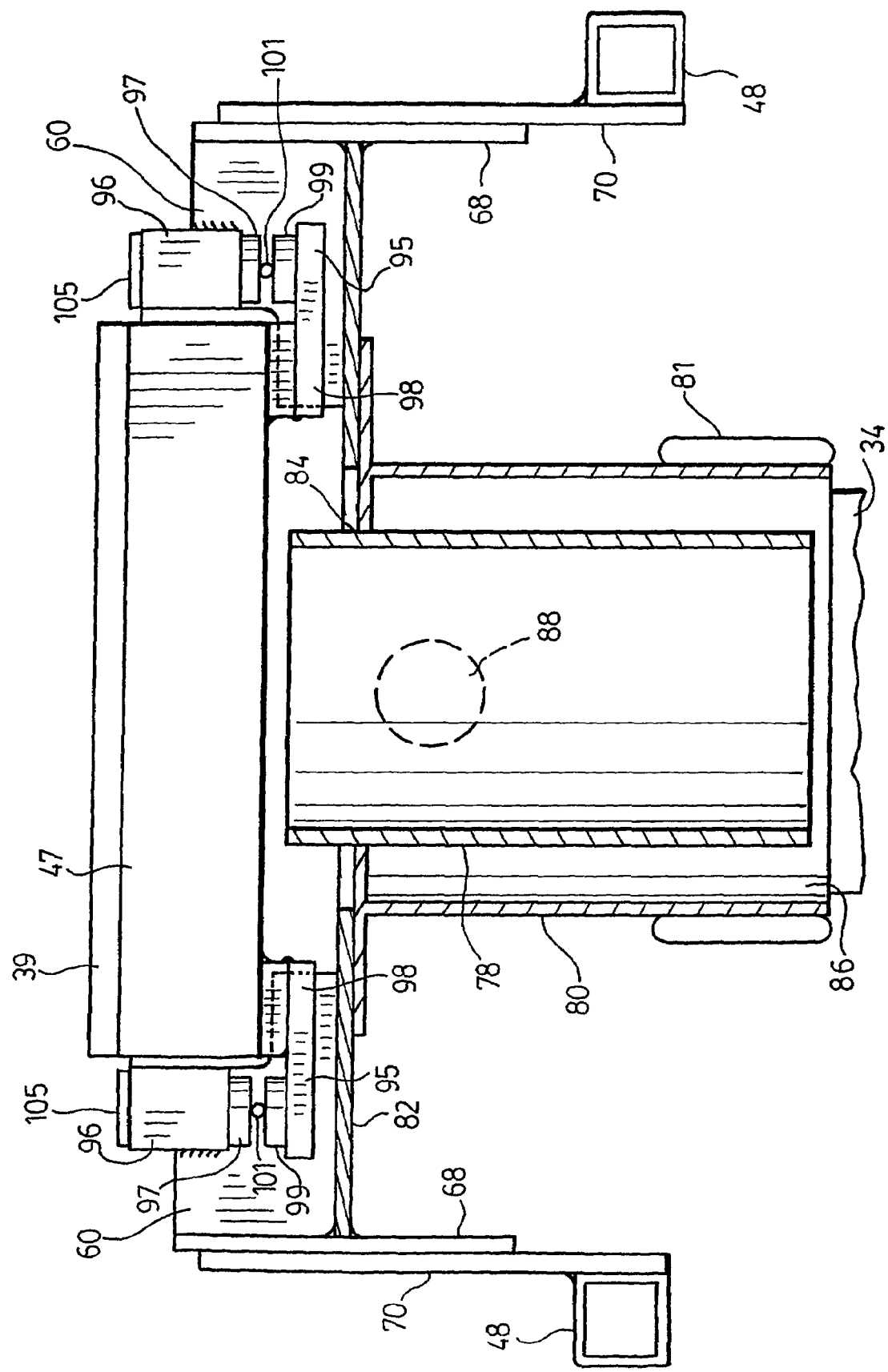
FIG. 4 is a front elevation view of the carriage frame of the apparatus shown in FIG. 1.

Attached to the front plate 39 is a rectangular frame 42 which is best seen in FIGS. 2 and 3. The frame 42 comprises a pair of frame members 43, 44 extending forwardly and horizontally from the vertical portion 40 of front plate 39. Each of the frame members 43, 44 is preferably supported in its horizontal position by a support bracket 45. The frame 42 further comprises a plurality of cross members extending between and attached to the frame members 43, 44. A first horizontal cross member 46 is attached to the vertical portion 40 of front plate 39 along substantially its entire length. A second cross member 47 extends between the front ends of frame members 43, 44 and a third cross member 49 extends between frame members 43, 44 approximately halfway between the cross members 46, 47. The frame members 43, 44 and the cross members 46, 47 and 49 may preferably all be of a rectangular tubular construction and are preferably welded together.

The carriage frame 22 also comprises a bag support structure in the form of a pair of horizontal hanger arms 48 extending parallel to the support arm 34 and parallel to the frame members 43, 44 of the rectangular frame 42. The front and rear ends of each hanger arm 48 are provided with hangers 50, 52 from which the bag 20 is suspended by loops 54. The rear hangers 52 are slidable from the rear ends of hanger arms 48 to approximately the center points of hanger arms 48, thus permitting an operator to easily hang the bag 20 from the front of the apparatus 10. Hanger rods 56 are provided to assist the operator in moving the rear hangers 52. The hanger rods 56 have one end attached to one of the rear hangers 52 and an opposite end located alongside the hanger arm 48 approximately midway between its ends. The rear hangers 52 are moved toward the front of the apparatus 10 by pulling hanger rods 56 toward the front of the apparatus. Once the bag 20 is mounted to the hangers 50, 52, the rear hangers 52 are returned to the positions shown in the drawings, coming to rest against stops 58. Although the apparatus 10 shown in the drawings utilizes rear hangers 52 which can be manually moved by hanger rods 56, it will be appreciated that apparatus 10 may instead incorporate automated means for moving rear hangers 52 along the hanger arms 48. For example, pneumatic cylinders (not shown) may be provided for the purpose of moving the rear hangers 52. It will also be appreciated that the portions of hangers 50, 52 on which the bag loops 54 are received may be pointed in directions other than that shown in the drawings.

In the first embodiment of the invention, the hanger arms 48 are mounted so as to extend from front to back of the filling apparatus 10. This orientation is used where the bags are mounted and removed from the front of the apparatus 10. It may, however, be preferred to mount and remove the bags 20 from the side of the apparatus 10, in which case the hanger arms 48 will preferably be mounted so as to extend from side to side of the filling apparatus, and will therefore be perpendicular to the support arm 34.

The bag support structure further comprises a pair of connecting arms 60 through which the hanger arms 48 are attached to the rectangular frame 42. Each connecting arm 60 has an outer end which is proximal to one of the hanger arms 48 and an inner end which is distal to the hanger arm 48. The connecting arms 60 extend at right angles to the hanger arms 48 and are located approximately midway between the cross members 47, 49 of the frame 42. Each connecting arm 60 comprises a pair of spaced, parallel steel angle pieces 62, 64 having horizontal flanges facing away from each other and having parallel vertical flanges which may be reduced in height proximate the inner ends of arms 60. The inner ends of connecting arms 60 are attached to the upper surface of a mounting plate 82 which is described in greater detail below. The connecting arms 60 are preferably attached to the plate 82 by welding the horizontal flanges of angle pieces 62, 64 to the upper surface of plate 82.

The outer end of each of the connecting arms 60 is connected to one of the hanger arms 48 through a pair of overlapping vertical plates 68, 70. The first plate 68 may be rectangular and has once face which is attached to the outer end faces of the angle pieces 62, 64, preferably by welding. The opposite face of first plate 68 is joined to the second plate 70 in an overlapping manner. It is preferred that plates 68, 70 are joined to each other by mechanical fasteners (not shown). In FIG. 3 a number of apertures for mechanical fasteners are shown on the second plate 70. This permits the second plate 70 to be fastened to the first plate 68 in a number of vertical positions, thereby providing the hanger arms 48 with a limited amount of height adjustability. In situations where height adjustment is not needed, it will be appreciated that first plate 68 may be omitted and the second plate 70 may be joined directly to the outer end of the connecting arm 60.

As shown in the drawings, the second plate 70 has a lower end portion 72 which is connected to the side of the hanger arm 48 and which is offset toward the front of the hanger arm 48. This offset permits the rear hangers 52 to slide along hanger arms 48 as far as possible toward the front of apparatus 10 to facilitate mounting of the bag 20.

The carriage frame 22 is also provided with a cylindrical filling head 76 through which the nozzle of a discharge apparatus (not shown) discharges a material into an inlet nozzle 21 of bag 20. The filling head 76 comprises a pair of concentric cylinders 78, 80 and mounting plate 82 which is provided with a centrally located circular aperture 84. The front and rear edges of plate 82 are folded upwardly to form flanges 92, 94 for improved rigidity.

The inner cylinder 78 has open upper and lower ends and has a side wall which closely fits inside and is sealed to the edges of aperture 84, for example by welding. Inner cylinder 78 is provided with an annular flange 79 below its upper end. The flange 79 is secured to the underside of mounting plate 82, for example by welding. The outer cylinder 80 has an upper end which is sealed to the lower surface of flange 79, such that an annular space 86 is formed between cylinders 78, 80. The annular space 86 is open at its lower end and closed at its upper end. The sidewall of the outer cylinder 80 is provided with an aperture 88 which communicates with the annular space 86, the aperture 88 being provided with a cylindrical fitting 90 for connection to a vacuum source (not shown). During filling of the bag 20, the outer cylinder 80 is sealed to bag nozzle 21 and as a solid material is filled into the bag 20 through the inner cylinder 78 the displaced air is evacuated from bag 20 through the annular space 86. This arrangement ensures that particulate matter entrained with the displaced air does not enter the environment of the apparatus 10.

With reference to FIG. 3 it can be seen that the carriage frame 22 consists of two subassemblies. A first subassembly 72 comprises rectangular sleeve 24 (not shown in FIG. 3), support arm 34 (not shown in FIG. 3) and rectangular frame 42. A second subassembly 74 comprises the hanger arms 48, connecting arms 60, connecting plates 68, 70, mounting plate 82 and filling head 76. The second subassembly 74 is suspended from the first subassembly 72 in a manner which permits measurement of the weight of the second subassembly 74, the attached bag 20 and its contents. Preferably, the apparatus 10 is provided with a pair of load cells 95 which permit weighing of the second subassembly and the attached bulk bag. Load cells are devices which convert a load acting on them into an electrical signal. It will be appreciated that many types of load cells are commercially available and that the particular types of load cells illustrated in the drawings, which utilize a ball-in-cup arrangement, are merely examples of the types of load cells which may be used in the apparatus of the present invention.

In the apparatus 10 according to the first embodiment of the invention, each of the load cells 95 includes a first portion comprising an upper block portion 96 carrying an upper cup 97. The upper block portion 96 is connected to one of the connecting arms 60 intermediate its inner and outer ends. Specifically, the upper block portion 96 is located between the angle pieces 62, 64 with opposed side surfaces of the upper block portion 96 being welded to the vertical flanges of angle pieces 62, 64. The second portion of each load cell 95 comprises a lower block portion 98 which Is connected to the underside of one of the frame members 43 or 44 of frame 42 and has a portion which protrudes outwardly of the frame member 43 or 44 on which the lower cup 99 is attached. As indicated by the arrows in FIG. 3, the upper and lower cups 97, 99 are brought into engagement with a ball 101. The upper block portion 96 may also be attached to a flexure 103 comprising a metal plate 105 and secured to the side of frame member 43 or 44 by a bracket 107. The use of flexures 103 allows the load cells 95 to move freely in a vertical plane A, in which they are vertically aligned with the mid-points of the hanger arms 48, and are to therefore also aligned with the center of gravity of bag 20. The vertical alignment of the load cells 95 with the center of gravity of bag 20 permits the use of two load cells 95 and permits the structure of the carriage frame to be simplified.

The apparatus 10 preferably also includes means for raising and lowering the carriage frame 22 along the support post 12. As mentioned above, the carriage frame 22 includes a rectangular sleeve 24 which surrounds the post 12 and is connected to a drive motor 102 through a drive mechanism 100, which may preferably comprise a chain drive mechanism housed between the front and rear flanges 14, 16 of post 12. The components of the chain drive are illustrated in the drawings in an over-simplified manner for clarity. It can be seen from FIG. 2 that the side plates 30, 32 of the rectangular sleeve 24 are connected at 106 to a drive chain 108 which is driven by motor 102 mounted to the upper end of support post 12. The chain 108 extends between the drive sprocket 110 of motor 102 and a lower sprocket 109 mounted to the web 18 of support post 12. Preferably, a second set of chain 108 and sprockets 109, 110 are also provided on the opposite side of support post 12. Although not shown in FIGS. 1 to 4, the drive mechanism may further comprise guide wheels (not shown) attached inside sleeve 24 to guide the movement of sleeve 24 along the support post 12.

The apparatus 10 may further comprise means for vibrating and compacting the contents of the bag 20 as it is being filled, preferably in the form of a vibrating table 122. In some preferred embodiments the table 122 may comprise a "pop-up" vibrating cone table such as that described in commonly assigned Publication No. US 2005/0022700 A1 dated Feb. 3, 2005, which is incorporated herein by reference in its entirety. Alternatively, the means for vibrating and compacting the contents of bag 20 may instead comprise a conventional stationary vibrating table which may have a flat or conical upper surface for supporting the bag 20.

As shown in FIG. 1, the vibrating table 122 is positioned directly under bag 20 and may preferably be centered on vertical axis A. When in use, the vibrating table 122 engages the bottom of bag 20 so as to vibrate and compact the contents thereof. It will be appreciated that the height of bag 20 will be adjusted by raising and lowering the carriage frame 22, so that the vibrating table 122 can be raised into engagement with the bottom of bag 20. It will be appreciated that the cone table 122 is shown in its contracted form in the drawings.

As shown in the drawings, the support post 12 and the cone table 122 may both be mounted to a frame 124 which, as shown in FIG. 1, may preferably comprise a rectangular base 126 of tubular steel and/or angle sections on which the support post 12 is mounted. The base 126 comprises a pair of elongate legs 128 extending from the rear to the front of the apparatus 10 and a plurality of cross members 130, 132, 133 extending between the legs 128. The legs 128 extend forwardly to the front end of apparatus 10 in order to support the vibrating table 122. Covering the top of the rectangular base 126 is a rectangular plate 134 to which a pedestal base 136 of the support post 12 is attached by bolts (not shown) or the like. As mentioned above, the filling apparatus of the present invention preferably has a modular construction in order to meet the varying needs of users of filling equipment. The apparatus 10 as shown in the drawings includes a number of components which may be modified or eliminated in order to suit the needs of a particular user. The single support post 12 is a preferred feature of the specific embodiments of the invention described herein. As mentioned above, the support post 12 preferably has a pedestal base 136 by which it can be attached to a frame 124 or directly to a floor surface of the filling facility. Wherever possible, it is preferred to mount the support post 12 directly to the floor.

In situations where the size of the bags 20 being filled is constant and/or where the bags 20 are removed from the apparatus using a forklift, it may be preferred to eliminate the drive mechanism 100 for raising and lowering the carriage frame 22. In this case, it may be preferred to rigidly secure the rectangular sleeve 24 of carriage frame 22 directly to the support post 12, for example by securing the front and/or rear flanges 14, 16 of the sleeve 24 to the support post 12. Another option is to eliminate the rear plate 28 and side plates 30, 32 of sleeve 24, and simply bolt the front plate 26 to the front flange 14 of the support post 12.

An apparatus 150 according to a second embodiment of the invention is now described below with reference to FIGS. 5 to 8. Apparatus 150 incorporates many of the same components as in apparatus 10 described above. Accordingly, these components are referred to using the same reference numbers and a detailed description of these components is omitted.

Apparatus 150 includes a support post 12 (FIG. 6) and a carriage frame 152 which includes a rectangular sleeve 24. The support post 12 and rectangular sleeve 24 of apparatus 150 may preferably be the same as the like-numbered components of apparatus 10 described above. It will be appreciated that apparatus 150 preferably also includes a drive mechanism (not shown) which may be the same as the chain drive mechanism 100 of apparatus 10 described above.

The carriage frame 152 comprises a support arm 154 projecting forwardly from the front plate 26 of rectangular sleeve 24. The support arm is shown in cross section in FIG. 6. It is preferred that support arm 154 is horizontal. The support arm 154 is comprised of two components, a stationary arm 156 which is rigidly attached to the rectangular sleeve 24 through a mounting plate 158 and a pivoting arm 160 which is pivotably connected to stationary arm 156 for limited rotation about a pivot axis 162. The pivot axis 162 is horizontal and perpendicular to the support arm 154.

The stationary arm 156 of apparatus 150 is comprised of a pair of side plates 164, 166 and a top plate 168 extending between the side plates 164, 166. The stationary arm 156 therefore forms an enclosure which is open at its bottom and at its forward end.

The pivoting arm 160 has a proximal end portion 170 located rearwardly of pivot point 162, most of which is housed in the three-sided enclosure formed by the stationary arm 156, and a distal end portion 171 which extends out through the open front end of the stationary arm 156. The pivoting arm 160 may generally be of a Y-shape, with the proximal end portion 170 being relatively narrower so as to fit within the stationary arm 156 and the distal end portion 171 being relatively wider over most of its length and having two branch arms 172, 174 between which the filling head (described below) is received. It will be appreciated that the Y-shape of the pivoting arm 160 is preferred due to the relative widths of the support post 12 and the filling head in this embodiment, and that the shape of pivoting arm 160 is variable depending on the dimensions of other components of the apparatus 150.

It can be seen from the drawings that the pivoting arm 160 comprises a rectangular frame having pair of parallel elongate frame members 176, 178 extending from rear to front of apparatus 150 and a pair of crossmembers 180, 182 extending between the respective rear and forward ends of frame members 174, 176. The front crossmember 182 is relatively longer, extending outwardly for connection to the branch arms 172, 174 which are parallel to the elongate frame members 176, 178.

The pivoting arm 160 is connected to the stationary arm 156 at two points. Firstly, the elongate members 176, 178 are provided with aligned holes 184, 186 located in the pivot axis 162 and between their rear and forward ends. The holes 184, 186 of elongate members 176, 178 align with holes 188, 190 formed in the respective side plates 164, 166 of the stationary arm 156, the holes 188, 190 also being located in the pivot axis 162. A pivot pin 192 extends through the aligned holes 184, 186, 188, 190 and pivotably connects the pivoting arm 160 to the stationary arm 156. The holes 188, 190 may be provided with suitable bearings. Secondly, the rear crossmember 180 of the rectangular frame is connected to the top plate 168 of the stationary arm 156 through a single load cell 194 which is illustrated in the drawings as being of the ball-and-cup type, similar to the load cells 95 of apparatus 10 described above.

The load cell 194 comprises a first portion attached to the lower surface of top plate 168 and a second portion attached to the upper surface of cross member 180. The proximal end portion 170 of pivoting arm 160 pivots upwardly when a downwardly-directed load is applied to the distal end portion 171. This has the effect of applying a load to the load cell 194, which generates an electrical signal representative of the load applied to the distal end portion 171. In order to allow pivoting, the frame members 176, 178 are spaced from the mounting plate 158, side plates 164, 166 and top plate 168 of the stationary arm 156.

The branch arms 172, 174 of the pivoting arm 160 extend forwardly and are provided with holes 173, 175 near their forward ends for connection to a cylindrical filling head 200 through which a discharge apparatus (not shown) discharges a material into a bag 20 during filling. The filling head 200 is of similar construction to filling head 76 described above, comprising a pair of concentric cylinders 202, 204. As shown in the drawings, the inner cylinder 202 has open upper and lower ends and has a side wall which is closely received inside an annular flange 206 and is sealed to the annular flange 206, for example by welding. A portion of the inner cylinder 202 extends above the flange 206 for connection to the nozzle of the discharge apparatus (not shown). The outer cylinder 204 is concentric with the inner cylinder 202 and is sealingly attached at its upper end to the lower surface of flange 206, for example by welding. The outer cylinder 204 may also be provided with an annular flange 205 through which it is secured to the flange 206. This arrangement results in an annular space 208 being formed between cylinders 202, 204. The annular space 208 is open at its bottom and sealed at its top and serves the same purpose as annular space 86 described above. The outer cylinder 204 is provided with an outlet fitting 210 which communicates with the annular space 208 and is connected to a suitable source of vacuum (not shown). The lower end of outer cylinder 204 is preferably encircled by an annular outer ring 212 and an inflatable ring 214 is fixed to the lower end, between which the nozzle of bag 20 (not shown) is received in sealing engagement.

As shown in the drawings, the flange 206 of filling head 200 is secured to a flange 207 attached to the underside of a rectangular frame 216. The frame 216 comprises a pair of elongate, parallel frame members 218, 220 and a plurality of cross members. The frame members 218, 220 are spaced apart by a sufficient distance to receive the upper portion of the inner cylinder 202 between them. A first pair of cross members 222, 224 extends between the frame members 218, 220 and are also separated by a sufficient distance to receive the upper portion of the inner cylinder between them. Thus, the frame members 218, 220 and the cross members 222, 224 form a square enclosure through which the inner cylinder 202 of filling head 200 extends. It will be appreciated that the flange 206 of filling head 200 could be directly attached to the frame 42 rather than being attached to frame 42 through the flange 207.

Figure 6:
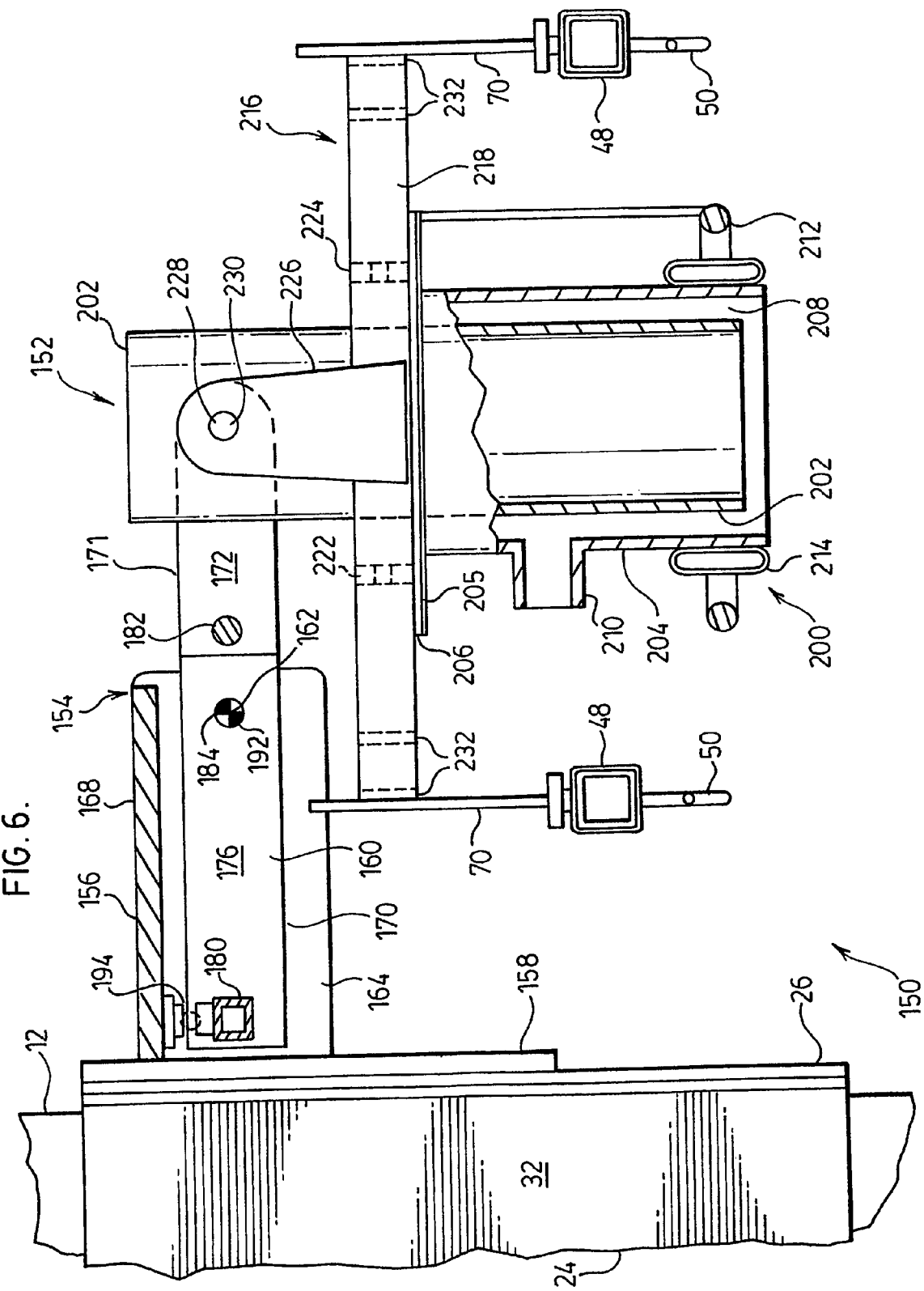
FIG. 6 is a right side elevation view of the bag filling apparatus of FIG. 5, with the support arm being shown in cross section and the hanger arms perpendicular to the support arm.
Figure 8:
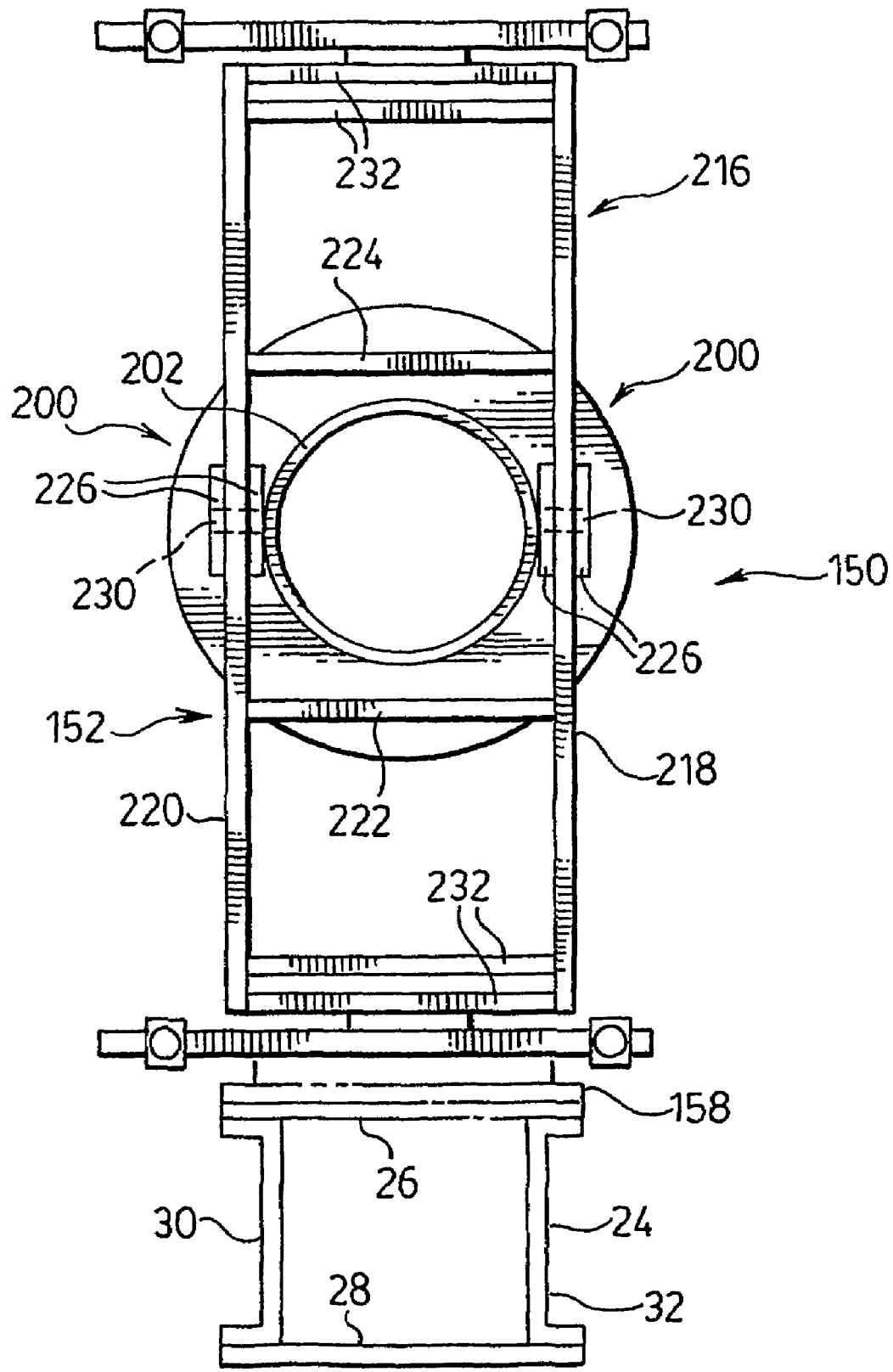
FIG. 8 is a top plan view of the bag filling apparatus of FIG. 5, showing the hanger arms perpendicular to the support arm as in FIG. 6.

As shown in FIGS. 6 and 8, secured to each of the frame members 218, 220, approximately midway between their ends, are a pair of mounting brackets 226 through which the frame 216 and the filling head 200 are pivotably connected to the pivoting arm 160 of support arm 154. The mounting brackets 226 of each pair are secured by suitable means to the frame members 218, 220 and are spaced apart to receive one of the branch arms 172 or 174 of the pivoting arm 160 between them. The brackets 226 are provided with holes 228 which are aligned with one another and with the central axis of the filling head 200. The brackets 226 are secured to branch arms 172, 174 by pivot pins 230 which are inserted through the holes 228 of brackets 226 and through the holes 173, 175 at the ends of branch arms 172, 174. Again, the pivoting connection between brackets 226 and branch arms 172, 174 may be provided with suitable bearings.

The carriage frame 152 of apparatus 150 further comprises a pair of hanger arms 48 which are provided with hangers 50, 52 for suspension of bag 20. The structure of hanger arms 48 and hangers 52 may preferably be the same as in apparatus 10. Although not shown in the drawings, the rear hangers 52 of apparatus 150 may be movable as in apparatus 10. Each of the hanger arms 48 is connected to the rectangular frame 216 through a plate 70 which is provided with multiple sets of apertures for height adjustability. The offset lower end 72 of each plate 70 is connected to a hanger arm 48 and the upper end is connected through a pair of apertures to an apertured crossmember 232 by fasteners such as bolts or the like (not shown). The crossmembers 232 extend between the frame members 218, 220 near their ends, and multiple crossmembers 232 may be provided at each end to permit adjustment of the spacing between the hanger arms 48. In apparatus 150 there are two cross members 232 at each end of the frame members 218, 220.

Figure 5:
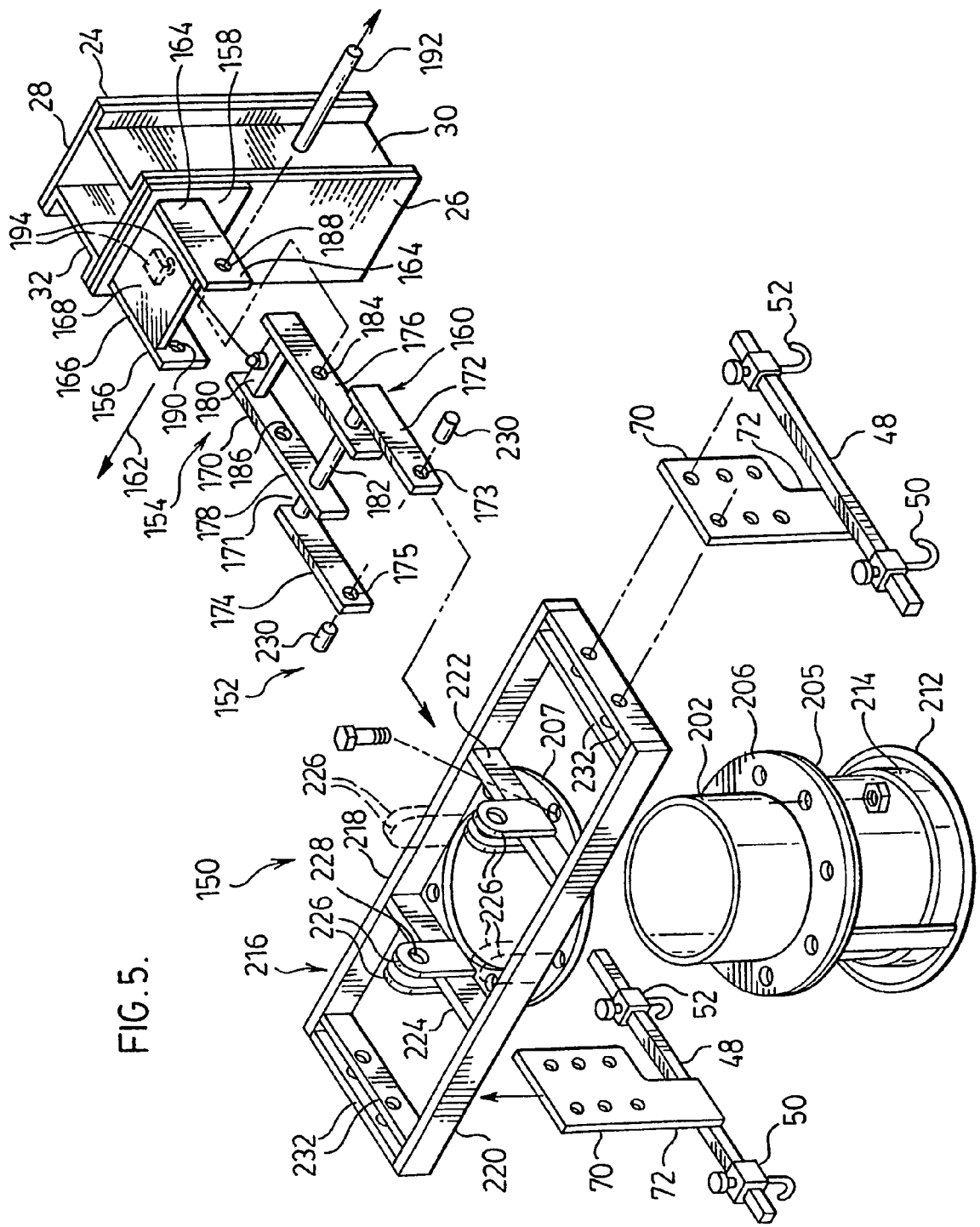
FIG. 5 is a perspective view of a portion of a bag filling apparatus according to a second embodiment of the invention, viewed from the front and the left side and showing the apparatus partially disassembled and showing the hanger arms parallel to the support arm.
Figure 7:
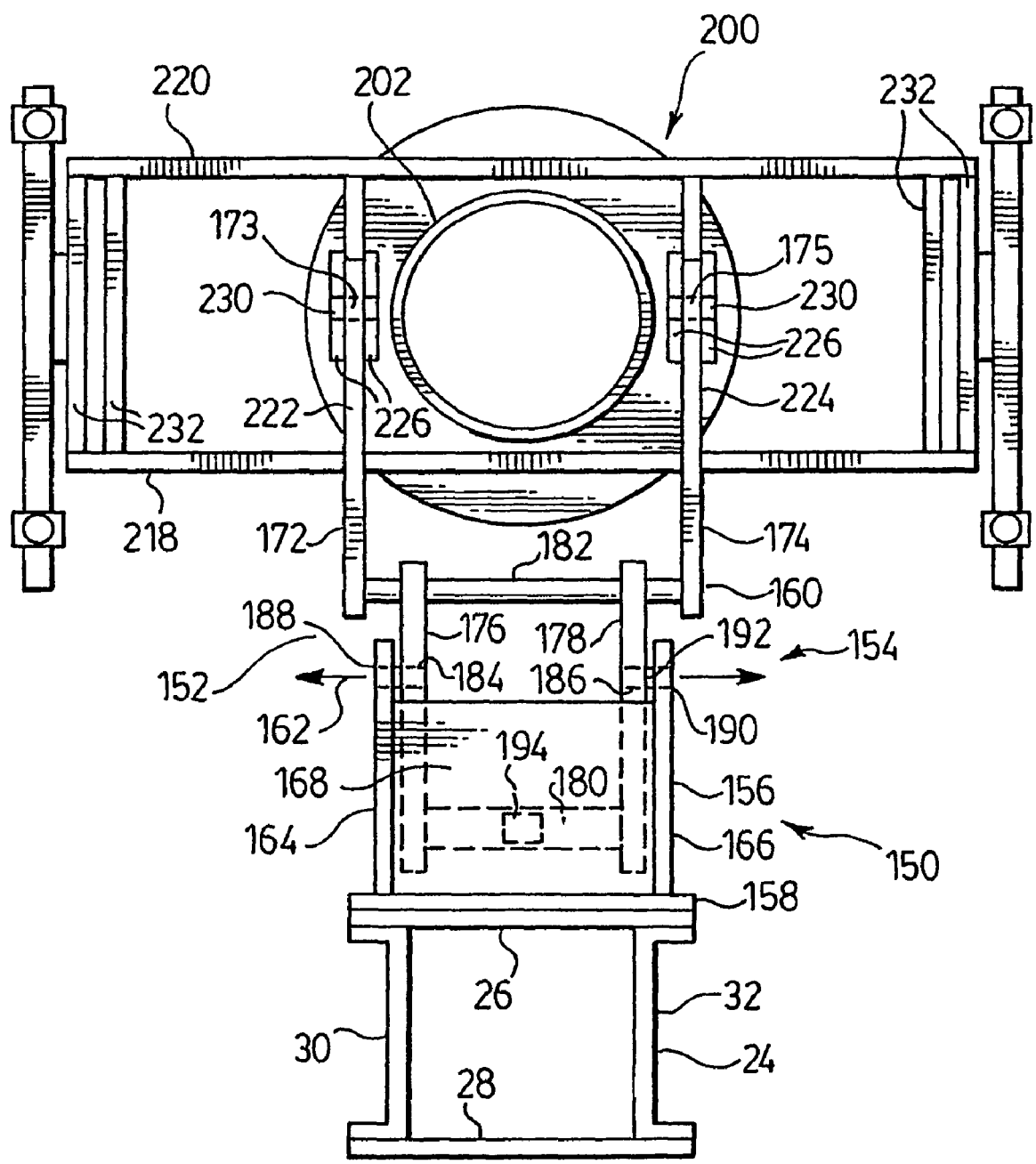
FIG. 7 is a top plan view of a portion of the bag filling apparatus of FIG. 5, showing the hanger arms in the same orientation as in FIG. 5.

In FIGS. 6 and 8 the apparatus 150 is shown with the hanger arms 48 extending from side to side to as to permit the bags 20 to be mounted and removed from the side of the apparatus 150. It will be appreciated that FIG. 8 only shows the relative orientations of the frame 42, hanger arms 48 and the rectangular sleeve 24. All other details of apparatus 150 have been eliminated from this drawing. Where it is desired for bags 20 to be mounted and removed from the front, the hanger arms 48 preferably extend from rear to front of the apparatus 150 as shown in FIGS. 5 and 7. The apparatus 150 may easily be modified to change the direction of hanger arms 48 merely by mounting brackets 226 on the cross members 222, 224 of frame 216, rather than on the elongate frame members 218, 220. In order to facilitate this modification, it may be preferred that mounting brackets 226 are removably mounted to the frame 216 by fasteners such as bolts or the like.

Figure 9:
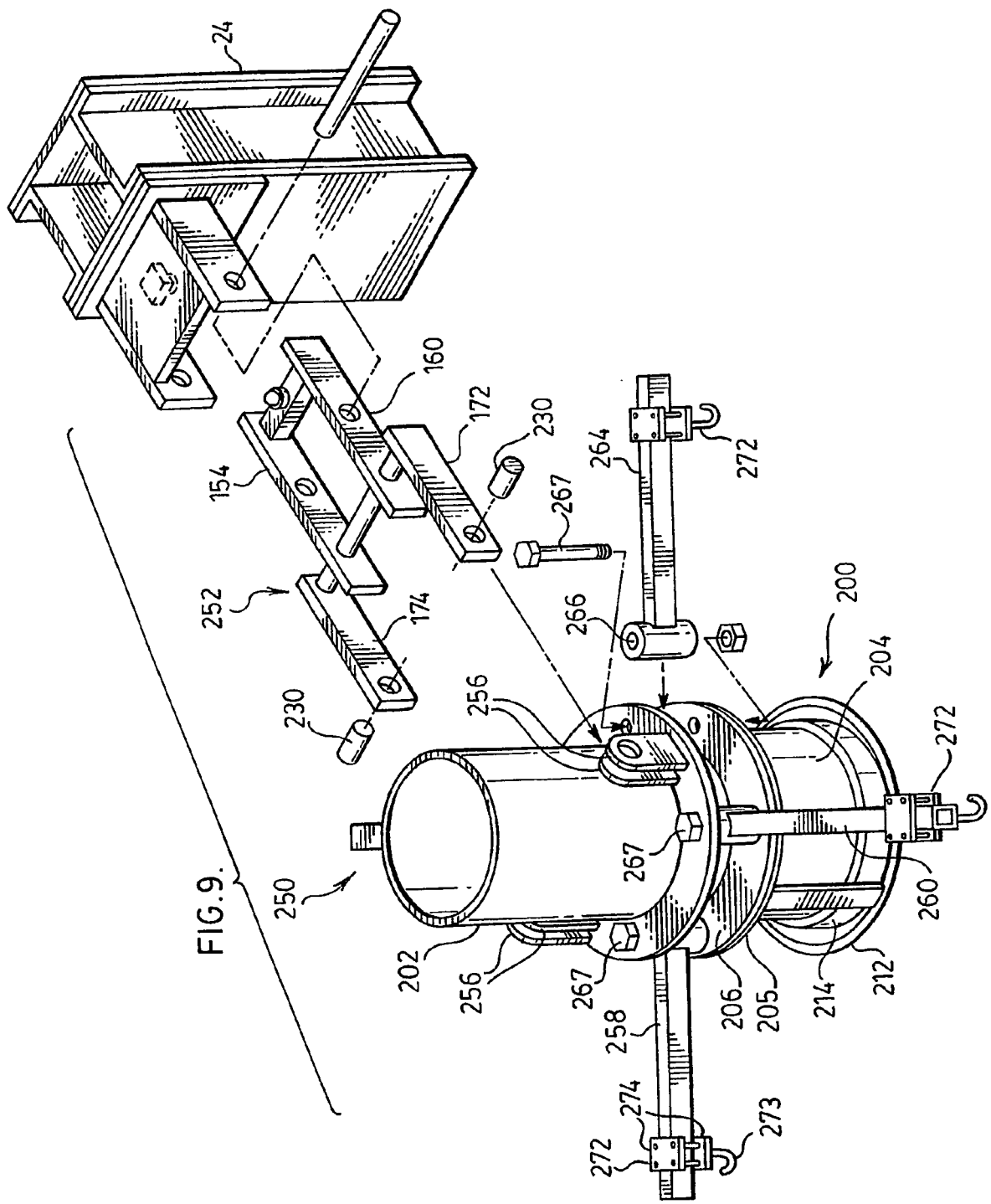
FIG. 9 is a perspective view of a portion of a bag filling apparatus according to a third embodiment of the invention, viewed from the front and the left side and showing the apparatus partially disassembled.
Figure 10:
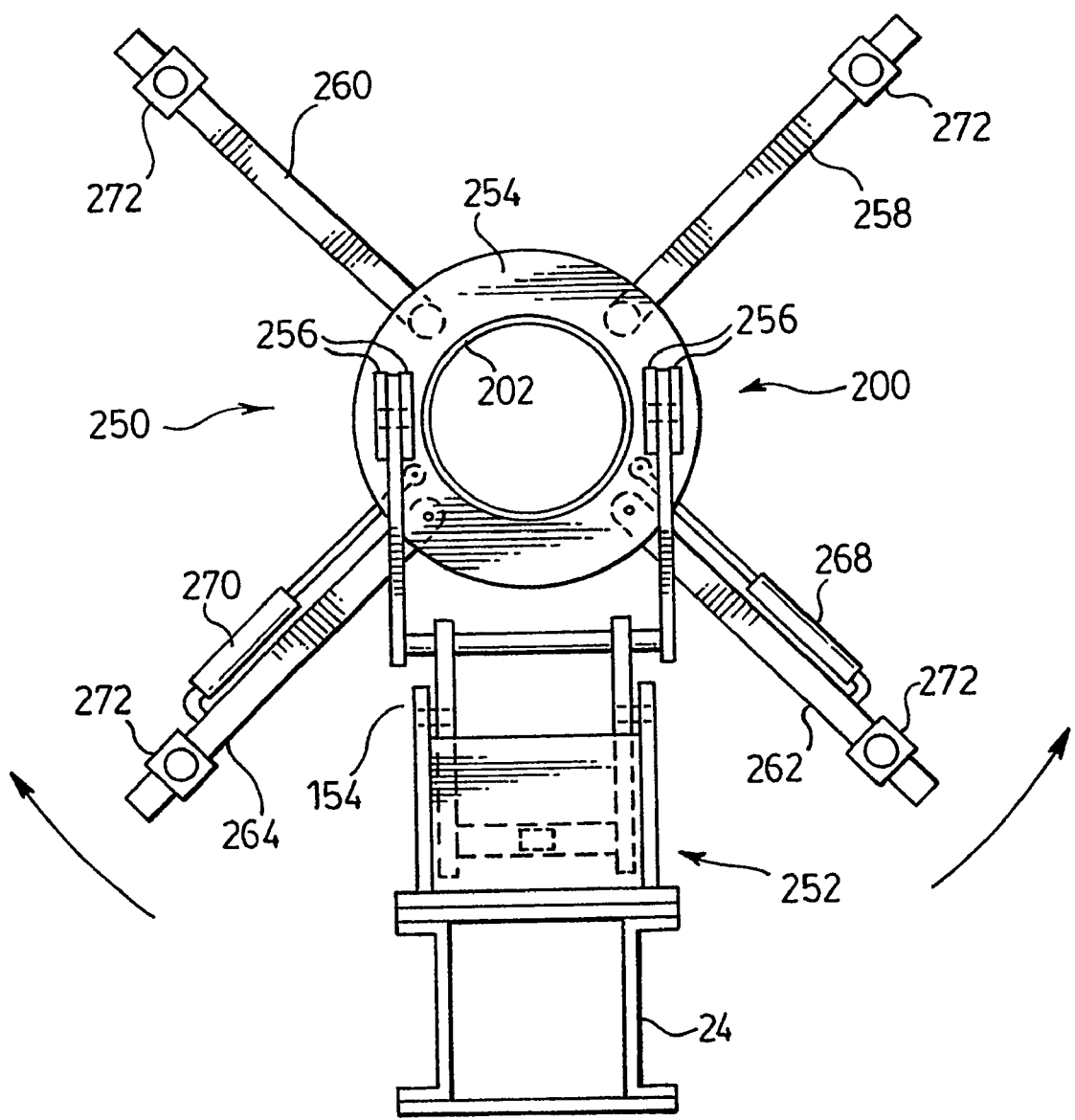
FIG. 10 is a top plan view of the apparatus of FIG. 9 with the hanger arms in a first orientation.
Figure 11:
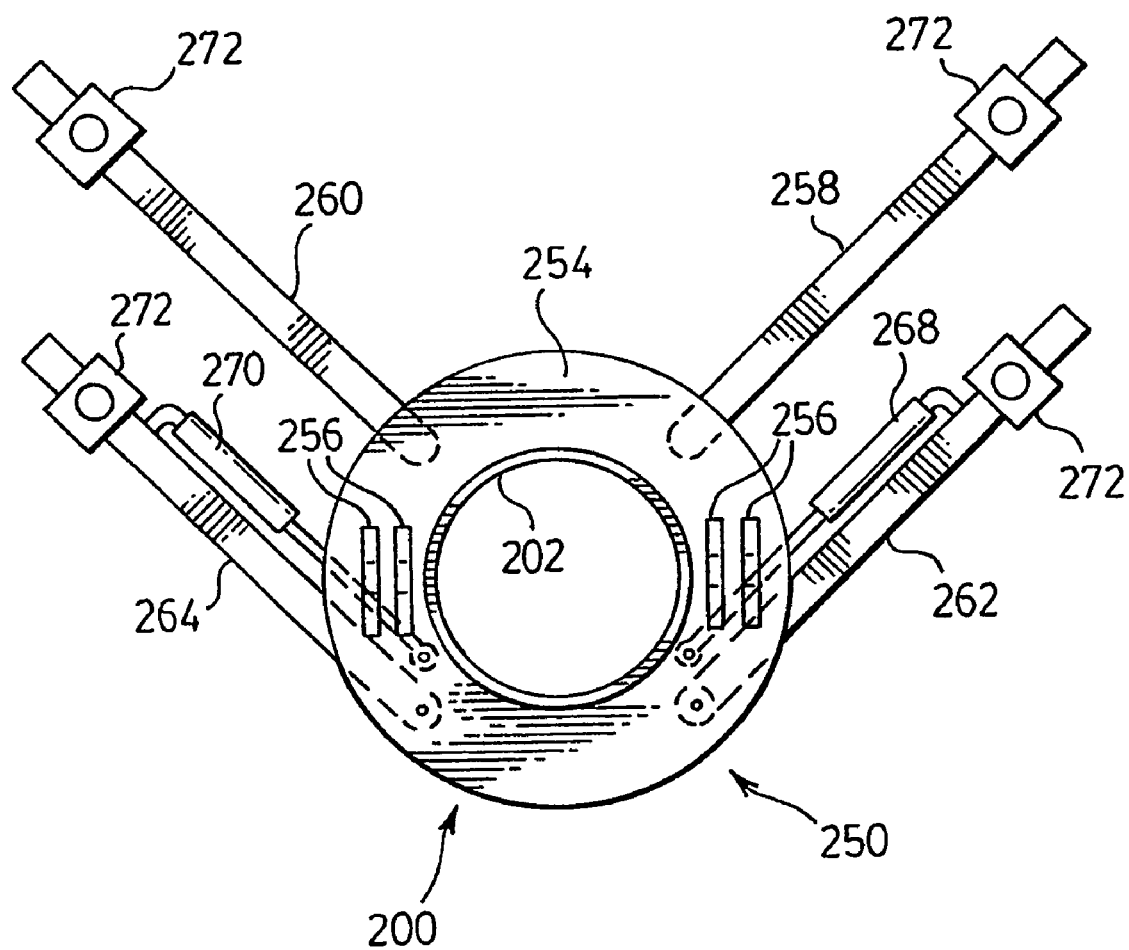
FIG. 11 is a top plan view of the apparatus of FIG. 9 with the hanger arms in a second orientation.

An apparatus 250 according to a fourth embodiment of the invention is now described below with reference to FIGS. 9 to 11. Most of the components of apparatus 250 are similar or identical to the components of apparatus 150 and/or 10 described above, and are referred to with the same reference numerals. Detailed description of these components is omitted.

The apparatus 250 includes a support post 12 (not shown) which may preferably be the same as the support post 12 of apparatus 10. The apparatus 250 includes a carriage frame 252 having a rectangular sleeve 24 which may preferably be the same as that of apparatus 10 and a support arm 154 which may preferably be identical to that of apparatus 150.

The apparatus 250 further comprises a filling head 200 which includes an inner cylinder 202, and outer cylinder 204 with a flange 205, an annular flange 206 sealed to the inner cylinder 202, a vacuum fitting 210 (not shown) for evacuating an annular space 208, an annular ring 212 and an inflatable ring 214. All these elements are the same as those described above with reference to apparatus 150.

The filling head 200 of apparatus 250 also includes a second annular flange 254 which is secured to the inner cylinder 202 above the annular flange 206 and below the top of cylinder 202. The upper surface of the second annular flange 206 is provided with paired mounting brackets 256 which are spaced apart by a sufficient distance to receive one of the branch arms 172 or 174 of the pivoting arm 160. The brackets 256 are provided with holes 258 which are aligned with one another and with the central axis of the filling head 200. The brackets 256 are secured to branch arms 172, 174 by pivot pins 230. The pivoting connection between brackets 226 and branch arms 172, 174 may be provided with suitable bearings. The brackets 256 may preferably be secured to the second annular flange 254 by welding.

The most significant difference between apparatus 250 and apparatus 150 is that the hanger arms of apparatus 250 form an X-pattern. A total of four hanger arms are provided, including a pair of stationary hanger arms 258, 260 and a pair of movable hanger arms 262, 264. The stationary hanger arms 258, 260 are directed toward the front of apparatus 250 while the movable hanger arms 262, 264 are rearwardly directed. All the hanger arms have a height which is substantially the same as the distance between the annular flanges 206, 254 and are provided with an aperture 266 at one end for connection between the flanges 206, 254 by fasteners such as bolts 267 or the like. The stationary arms 258, 260 are preferably held against movement between the flanges 206, 254, whereas the apertures 266 of the movable arms 262, 264 may be provided with bearings or the like (not shown) which permit pivoting movement of the arms 262, 264 about the apertures 266. In particular, the movable arms 262, 264 are pivotable from the rearward position shown in FIG. 10 to a forward position shown in FIG. 11 in which they are substantially parallel to the stationary hanger arms 258, 260. This facilitates mounting of the bag 20 by the operator.

The movable arms 262, 264 are movable either by manual means, for example a hanger rod such as rod 56 (not shown) of apparatus 10 may be attached to each of the movable arms 262, 264. Alternatively, a pair of pneumatic cylinders 268, 270 may be provided which are mounted alongside the movable hanger arms 262, 264, toward the front of the apparatus 250. One end of each pneumatic cylinder 268, 270 is connected to a hanger arm 262 or 264 near its free end and the opposite end of cylinder is pivotably connected to one or both of the annular flanges 206, 254. It will be appreciated that decreasing the lengths of cylinders 268, 270 causes the movable hanger arms to move forwardly, whereas increasing the lengths of cylinders 268, 270 causes them to move rearwardly toward the position they are in during filling.

It will be appreciated that the provision of movable hanger arms 262, 264 eliminates the need for movable hangers. Accordingly, the hangers 272 may be of simplified form and are preferably connected against movement to the hanger arms. In apparatus 250, the hangers 272 are in the form of hooks 273 which are secured to the hanger arms by pairs of plates 274.

An apparatus 350 according to a fourth embodiment of the invention is now described below with reference to FIGS. 12 to 14. Apparatus 350 incorporates many of the same components as in apparatus 10 described above. Accordingly, these components are referred to using the same reference numbers and a detailed description of these components is omitted.

Apparatus 350 comprises a single support post 12 having a pedestal base 136, and a carriage frame 22 having a rectangular sleeve 24 which may preferably be the same as that of apparatus 10 described above. The carriage frame 22 of apparatus 350 also includes a first bag supporting structure 352 identical to that of apparatus 10, which is mounted to the front plate 26 of the rectangular sleeve 24, and an identical, second bag supporting structure 354 mounted to the rear plate 28 of sleeve 24. The components of the front bag supporting structure 352 are identified below by the same reference numerals as in the description of the first preferred apparatus 10, while the components of the rear bag supporting structure 354 are identified by primed numbers.

As in apparatus 10, a bag 20 is supported from the front bag supporting structure 352. The bag 20 is in position to be filled from above in the direction of arrow B, with its bottom surface engaging the vibrating table 122. The rear bag supporting structure 354 carries a bag 20' which has already been filled and which is ready to be removed from apparatus 350 in the direction of arrow C.

The pedestal base 136 of support post 12 is mounted to a frame 124 through a turntable 360 which rotates the support post 12 around its longitudinal axis L as indicated by arrows D. The turntable 360 comprises a base 362 having a cylindrical housing 364 projecting from its upper surface. The turntable 360 further comprises a circular, horizontal support plate 366 supported on top of a vertically extending, cylindrical shaft 368. The shaft 368 is rotatably received in the cylindrical housing 364 and is supported by bearings 370, 372. The outer periphery of support plate 366 is provided with teeth 374 which engage a rotary actuator 376. The actuator 376 causes rotation of the support plate, thereby causing rotation of the support post 12 about axis L.

Figure 12:
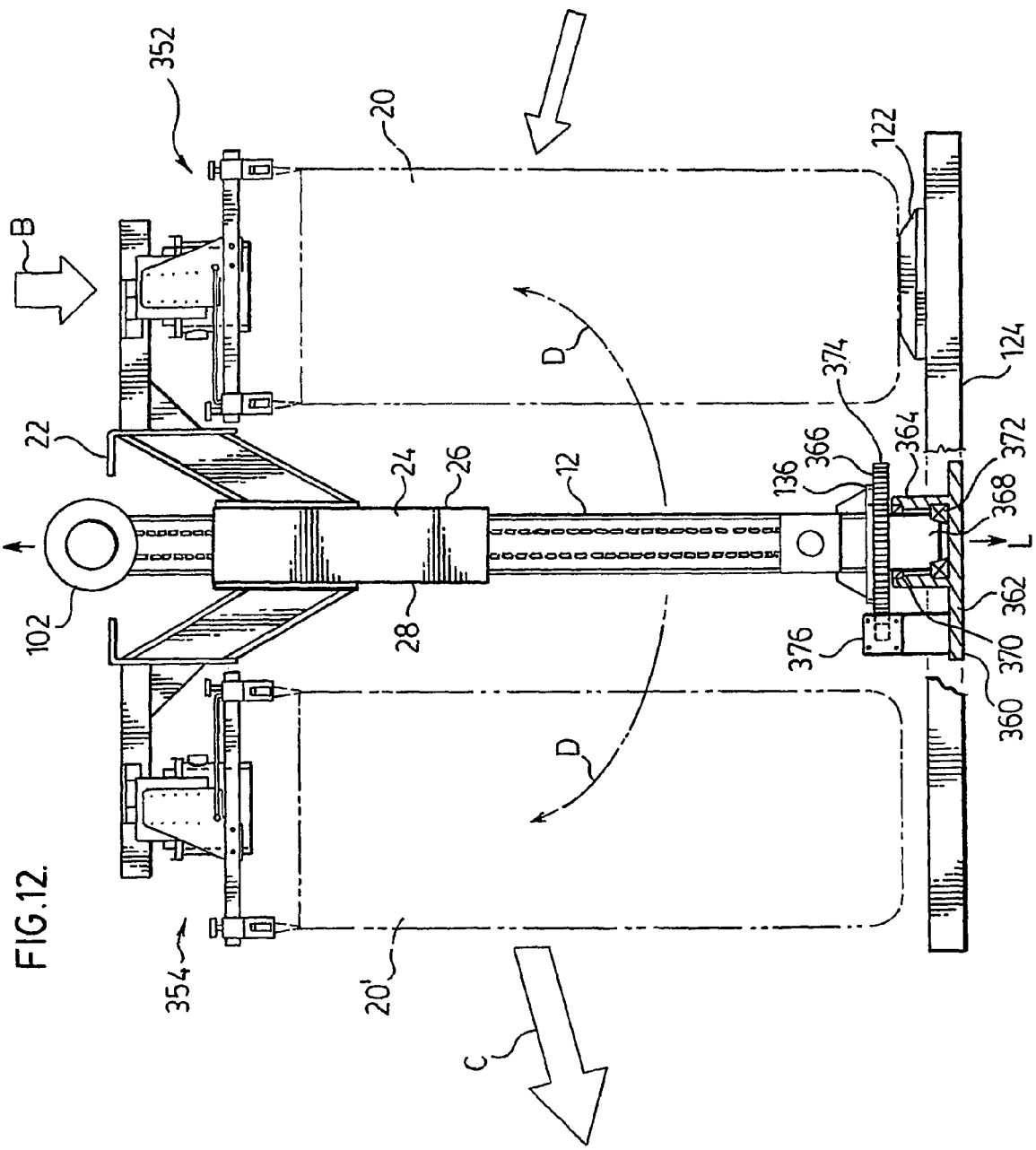
FIG. 12 is a side elevation view of a bag filling apparatus according to a fourth embodiment of the invention.

As can be seen from FIG. 12, rotation of the support post 12 by 180° will reverse the positions of the front and rear bag supporting structures 352, 354. The rotatable mounting of support post 12 and the provision of two bag supporting structures 352, 354 permits rapid, high efficiency filling of bags 20 and 20'. In particular, while bag 20 is being filled at the front of apparatus 350, i.e. in the position shown in FIG. 12, the already filled bag 20' can be removed from the rear bag supporting structure 354 by releasing the loops 54 from the hangers 50, 52 and by supporting the weight of the filled bag on a pallet (not shown) or the like. Once the filled bag 20' is removed, an empty bag 20 (not shown) can then be hung on the supports 50, 52. Once the front bag 20 is filled and the empty bag 20 is mounted to the rear bag supporting structure 354, the support post 12 is rotated by 180° to bring the empty bag 20 to the front of the apparatus 350. This bag 20 is then filled. Simultaneously, the filled bag 20, which has now moved to the rear of apparatus 350, is removed from the hangers 50, 52 and another empty bag 20 is mounted in its place, ready for filling.

Figure 13:
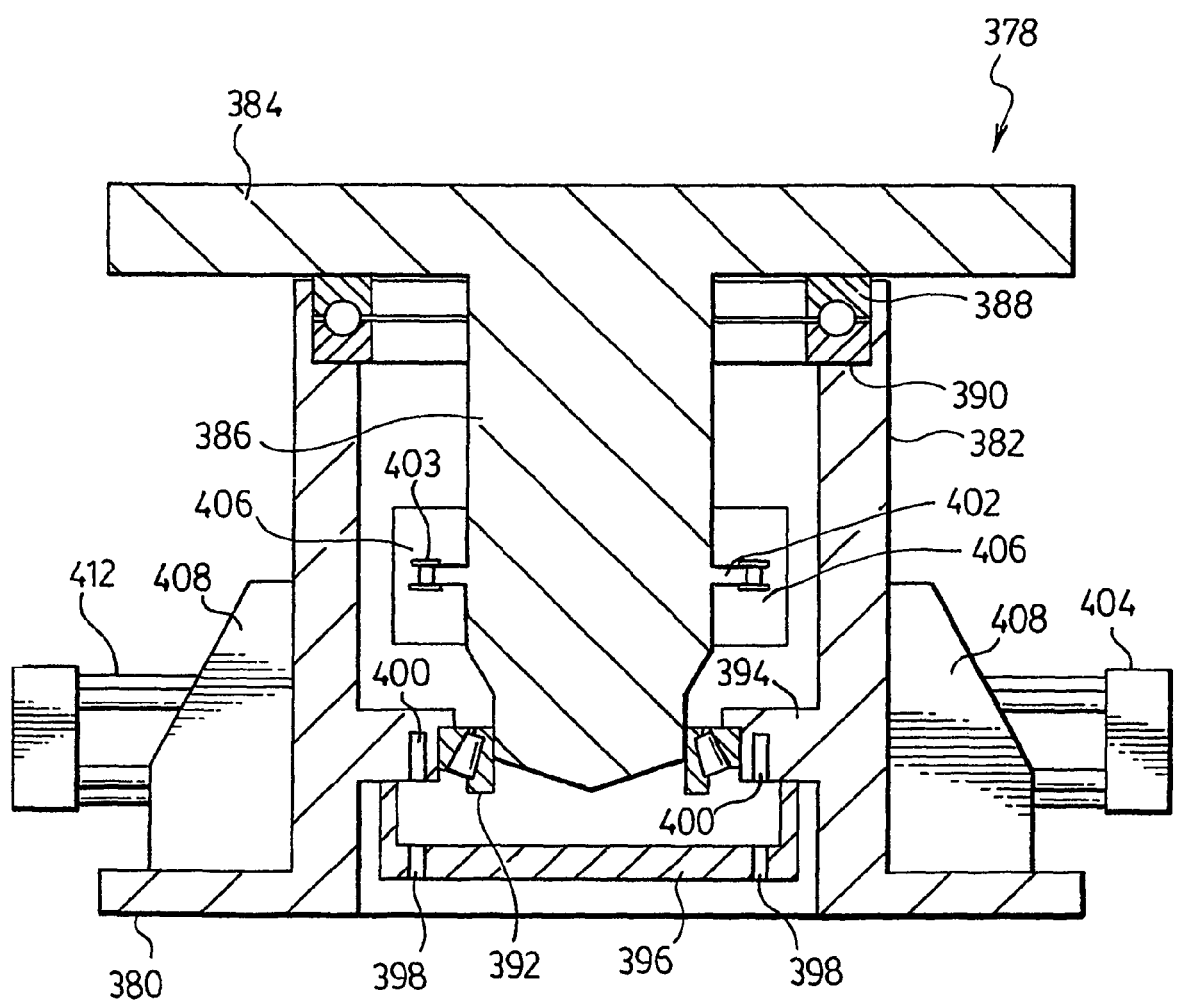
FIG. 13 is a front cross-sectional view of a turntable mechanism for use in a bag filling apparatus according to the fourth preferred embodiment.
Figure 14:
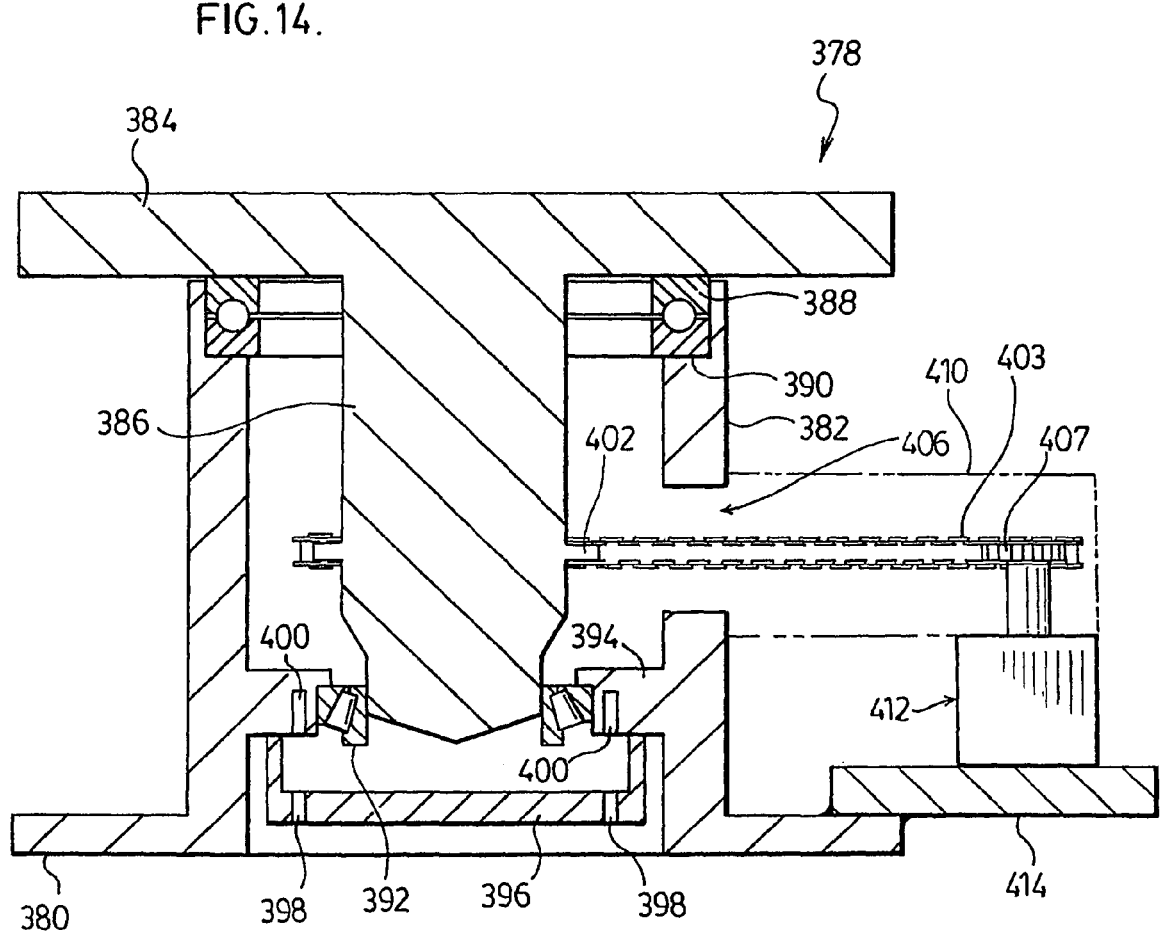
FIG. 14 is a side cross-sectional view of the turntable mechanism of FIG. 13.

FIGS. 13 and 14 illustrate a preferred form of turntable 378 that may be used in place of the turntable 360 shown in FIG. 12. The turntable 378 comprises a base 380 having a cylindrical housing 382 projecting from its upper surface. To provide support for the housing 382, a plurality of support brackets 408 are preferably attached to the base 380 and the housing 382. Turntable 378 further comprises a circular, horizontal support plate 384 attached to a vertical shaft 386. The support plate 384 is mounted on a bearing 388 which is received in a groove 390 formed in the inner surface of the housing 382, at its upper end. The lower end of the shaft 386 is provided with a bearing 392 which is mounted on an annular lip 394 which extends radially inward from the inner surface of the housing 382, near the base 380. The lower bearing 392 is covered by a cap 396 which is preferably provided with apertures 398 through which it is secured to holes 400 formed in the annular lip 394, for example by screws (not shown). Attached to the vertical shaft 386 intermediate its upper and lower ends is a sprocket 402.

The turntable 378 also includes a rotary actuator 404 to rotate the support plate 384. The actuator 404 has a drive sprocket 407 which is connected to the sprocket 402 of the vertical shaft 386 by a chain 403 which extends through a pair of holes 406 provided in the side of cylindrical housing 382. The drive sprocket 407 and the chain are enclosed by a guard 410 having a curved forward end for engagement with the cylindrical housing 382. The actuator 404 may preferably comprise a pneumatic cylinder (not shown) and a rack and pinion mechanism 412 which converts the linear motion of the cylinder rod to rotational motion of the drive sprocket 407. The actuator 404 is secured to a mounting plate 414 which is attached to the base 362.

Figure 15:
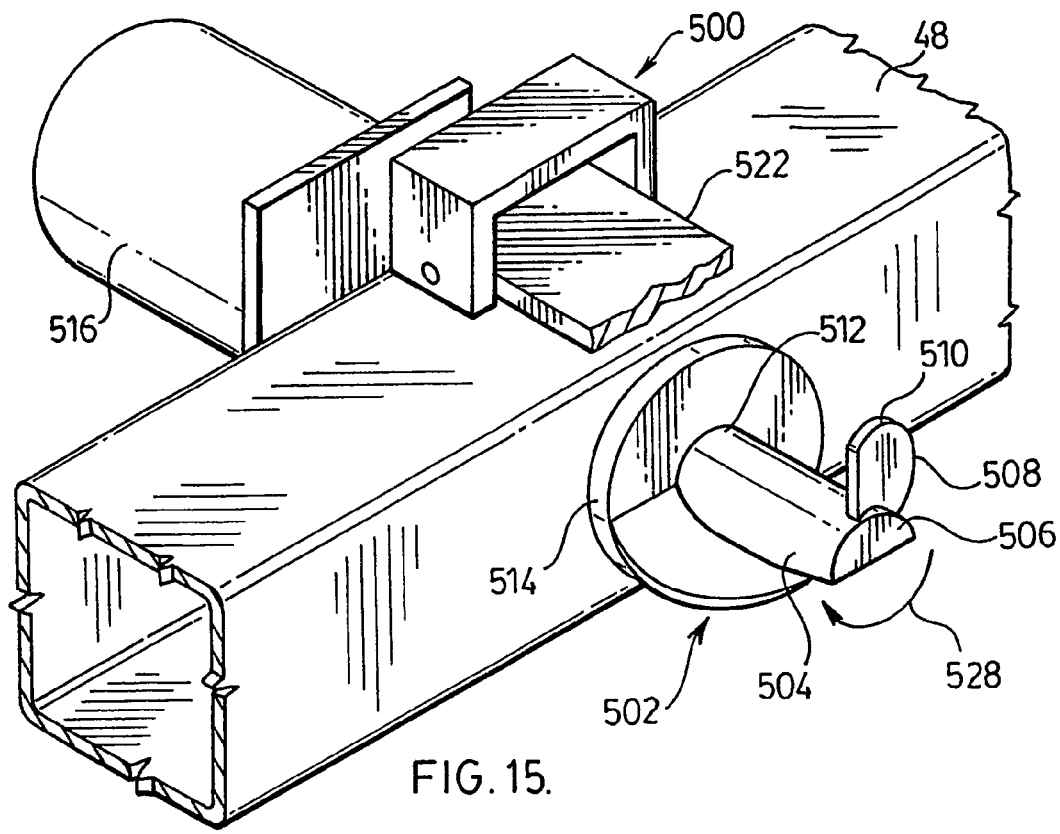
FIG. 15 is a perspective view of a preferred bag release mechanism according to the invention.
Figure 16:
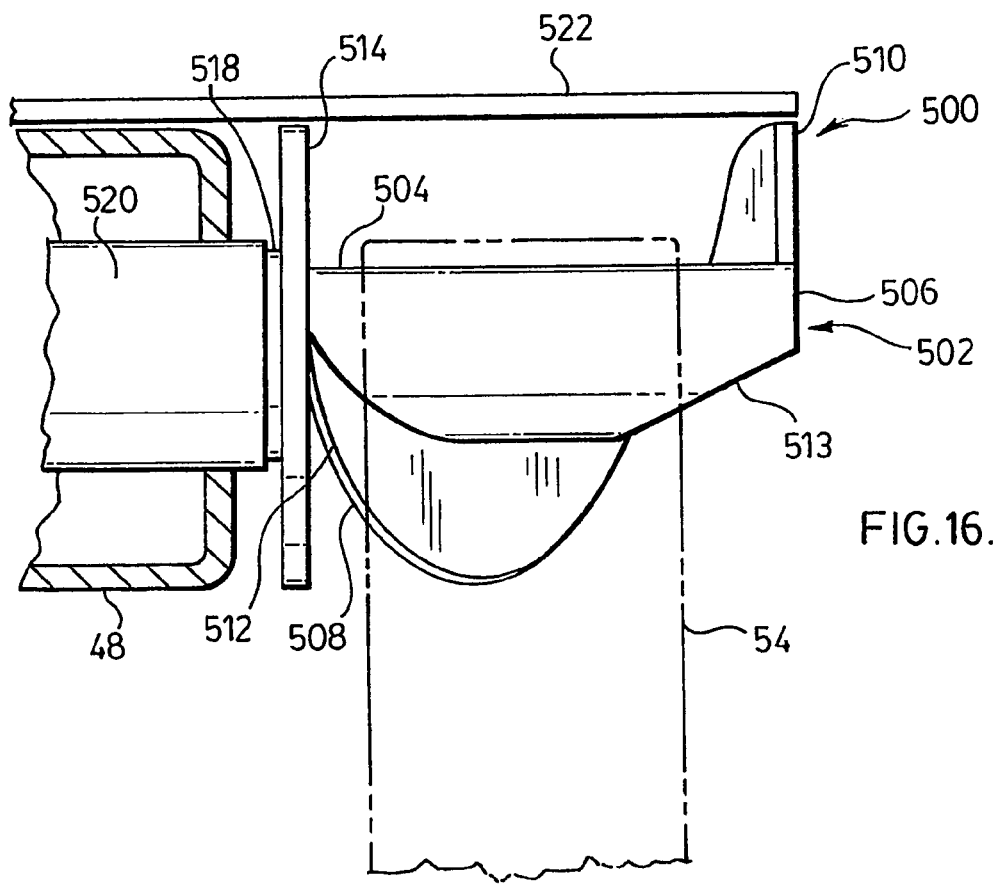
FIGS. 16 to 18 are side elevation views of the bag release mechanism of FIG. 15.

According to yet another embodiment, there is provided an automated mechanism for releasing the loops 54 of a bulk bag 20 from the hanger arms 48 of a bag filling apparatus. This embodiment is now described with reference to FIGS. 15 to 18. According to this embodiment, the hanger arms 48 are provided with release mechanisms 500 instead of hangers 50, 52 of the previously described embodiments. The release mechanism comprises a loop support arm 502 on which the bag loops 54 are received during use of the filling apparatus (not shown). The support arm 502 according to this embodiment comprises a cylindrical rod 504 having a free end 506 which receives the loop 54 as shown in FIG. 16. The outer surface of the cylindrical rod 504 is provided with a helical thread 508, comprising a rib which is wrapped around the rod 504 rearwardly from its free end 506. The thread 508 is shown as being of substantially constant height throughout its length, but this is not necessarily the case. The pitch of the thread 508 is relatively large so that a distance between a front thread portion 510 and an adjacent rear thread portion 512 is sufficient to permit the bag loop 54 to be received directly on the outer surface of rod 504 between thread portions 510, 512. In the embodiment shown in the drawings, the helical thread 508 is of substantially constant height and does not quite wrap completely around the outer surface of rod 504 between the front thread portion 510 and the rear thread portion 512.

As shown in the drawings, the free end 506 of support rod 504 is provided with a beveled surface 513 for reasons which will be explained below. The beveled surface 513 preferably faces in a direction which is opposite to the vertical direction in which the front thread portion 510 extends. In the orientation of support arm 502 shown in FIGS. 15 and 16, the bevel 513 faces downwardly.

In the embodiment of FIGS. 15 to 18, the support arm 502 is mounted to a plate 514 which is rotatably connected to the shaft 518 of a motor 516 located on the opposite side of the hanger arm 48. The shaft 518 is attached to the plate through a sleeve 520. The motor 518 is supported by an L-shaped bracket 521 having one edge attached to the underside of the hanger arm 48. Although the support rod 502 of this embodiment is connected to motor 516 through the hanger arm 48, this is not necessarily the case. It will be appreciated that the support rod 502 could instead be located above or below the hanger arm 48.

The release mechanism 500 may further comprise a cover plate 522 extending along the top of the hanger arm 48 parallel to the support arm 502, and preferably having a length sufficient that it extends to the free end 506 of the support arm 502, and may preferably make contact with the front thread portion 510. The rear end of the cover plate 522 is hinged at 524 and is mounted to hanger arm 48 by bracket 526. This permits the plate 522 to be lifted out of engagement with the front portion 510 of thread 508, thereby allowing a bag loop 54 to be placed over the support arm 502 as shown in FIG. 15.

Figure 17:
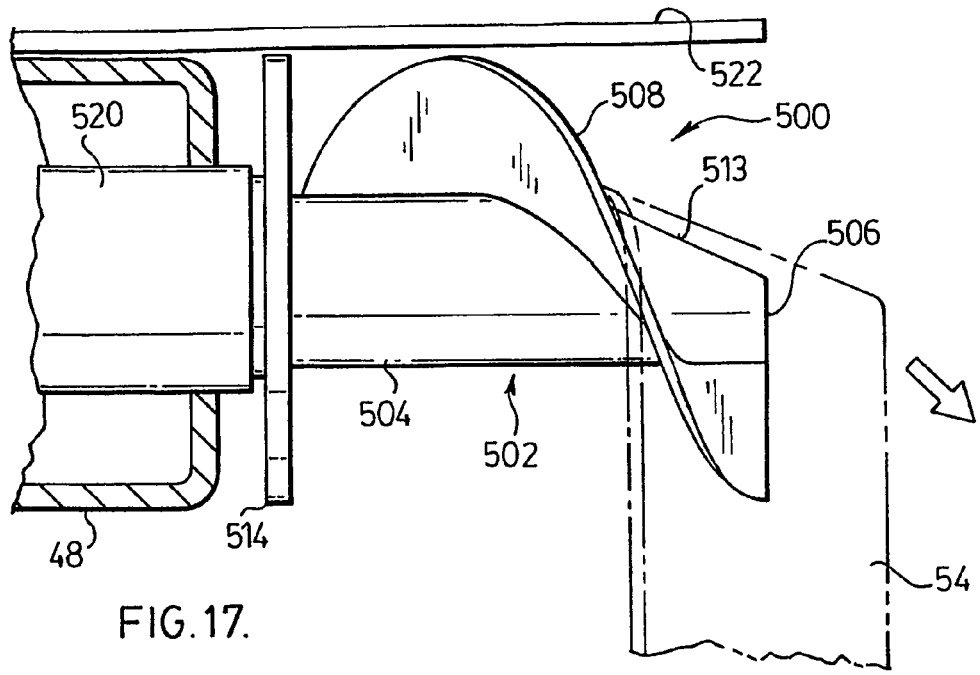

Operation of the release mechanism 500 is now discussed with reference to FIGS. 15 to 18. First, the support arm 502 is oriented in the position shown in FIGS. 15 and 16, with the front portion 510 of thread 508 projecting upwardly from the free end of arm 502, and with a portion of the cylindrical rod 504 extending rearwardly from the front thread portion 510 having an upper surface of sufficient length (measured axially along the rod 502) for support of the loop 54. The cover plate 522 is lifted upwardly away from the front portion 510 of thread 508 to permit the loop 54 of an empty bulk bag (not shown) to be slipped over the free end 506 of support arm 502. Once the loop 54 is received on support arm 502 as shown in FIGS. 16 and 17, the cover plate 522 is lowered so as to prevent accidental release of the loop 54, particularly while the bag remains empty and the loop 54 may be loosely received on support arm 502. The release mechanism 500 is then maintained in this configuration until the bag is filled.

Once the bag is filled and the filling nozzle is disengaged from the bag, the bottom of the bag is supported on a pallet (not shown) or the like and the loops 54 are disengaged from the support arms 502 in the following manner. The support arm 502 is rotated in the direction of arrow 528 of FIG. 15 (clockwise), thereby causing the front portion 510 of thread 508 to rotate away from the cover plate 522, leaving a gap between the cover plate 522 and the support arm 502 through which the loop 54 can pass. During rotation, the helical thread 508 advances the loop 54 toward the free end 506 of support arm 502 until it is ejected from the support arm 502.

In FIG. 17, the support arm 502 has rotated by about 180 degrees. At this point, the loop 54 has been advanced to the free end 506 of support arm 502, and is supported on the beveled surface 513. In this orientation, the beveled surface 513 slopes downwardly toward the free end of the support arm 502, to assist in ejecting the loop 54.

Figure 18:
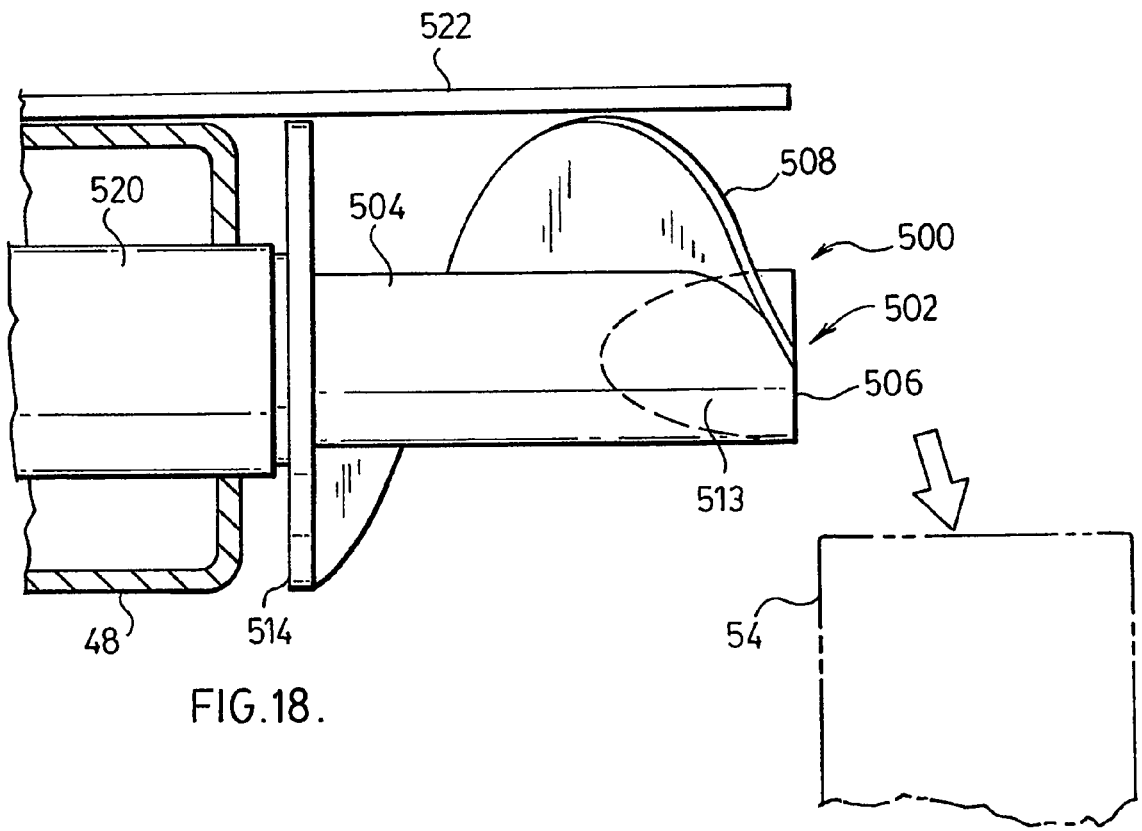

In FIG. 18, the support arm 502 has completed a 270 degree rotation. At this point, loop 54 has been ejected and control arm 502 is rotated back to the initial position shown in FIGS. 15 and 16.

Although the invention has been described by reference to certain preferred embodiments, it is not limited thereto. Rather, it is intended that the invention includes all embodiments which may fall within the scope of the following claims.

What is claimed is:

1. A bulk bag filling apparatus, comprising:
    (a) a first support member having an upper end and a lower end and being oriented in a generally vertical direction;
    (b) a second support member connected to said generally vertical member and extending at an angle to said generally vertical direction;
    (c) a filling head for engagement with an opening of the bulk bag, wherein the filling head is connected to and supported by the second support member;
    (d) a bulk bag support structure for engagement with support elements of the bulk bag, wherein the bulk bag support structure is connected to and supported by the second support member; and
    (e) a hang-weighing mechanism for weighing the contents of the bulk bag, wherein the bulk bag support structure is connected to said second support member through said hang-weighing mechanism;
    wherein the bulk bag support structure comprises a pair of parallel hanger arms extending along either side of the filler head, and wherein the hanger arms are provided with a plurality of hangers for engaging the support elements of the bulk bag, the support elements comprising loops;
    wherein the filling head support structure comprises a frame structure connected to an end of the second support member which is distal to said first support member, wherein the filling head is rigidly secured to said frame structure, and wherein said hang-weighing mechanism comprises a pair of hang-weighing devices, each of which is interconnected between the filling head support structure and one of the hanger arms, such that the hanger arms are suspended from the hang-weighing devices; and
    wherein each of the hanger arms is suspended from the filling head support structure by a plate having means for adjusting the height of the hanger arms.

2. The apparatus of claim 1, wherein the hang-weighing apparatus includes one or two load-bearing points at which the bulk bag support structure applies a load to the hang-weighing apparatus.

3. The apparatus of claim 2, wherein a load cell is provided at each of said load-bearing points, wherein each of said load cells converts said load into an electrical signal representative of the weight of the bulk bag and its contents.

4. The apparatus of claim 1, further comprising:
    (f) a filling head support structure to which the filling head is connected, wherein both the filling head and the filling head support structure are connected to and supported by the second support member.

5. The apparatus of claim 4, wherein the filling head support structure comprises a frame structure connected to an end of the second support member which is distal to said first support member, and wherein the filling head is rigidly secured to said frame structure.

6. The apparatus of claim 5, wherein the frame structure comprises a framework of generally horizontal members to which the filling head is secured, wherein the filling head comprises a pair of concentric cylinders separated by an annular space.

7. The apparatus of claim 1, wherein the hang-weighing devices comprise load cells which are aligned with one another along a horizontal axis passing through a centre of the filling head.

8. The apparatus of claim 1, wherein each of the hanger arms is provided with two of said hangers, the hangers being located proximate to the ends of the hanger arms, wherein the hanger arms are suspended at points located approximately midway between their ends from the hang-weighing devices, and wherein a center point of the filling head is approximately equidistant between the hanger arms.

9. The bulk bag filling apparatus of claim 1,
wherein the angle at which the second support member extends is from about 45-90 degrees to the generally vertical direction.

10. A bulk bag filling apparatus comprising:
(a) a first support member having an upper end and a lower end and being oriented in a generally vertical direction;
(b) a second support member connected to said generally vertical member and extending at an angle to said generally vertical direction;
(c) a filling head for engagement with an opening of the bulk bag, wherein the filling head is connected to and supported by the second support member;
(d) a bulk bag support structure for engagement with support elements of the bulk bag, wherein the bulk bag support structure is connected to and supported by the second support member; and
(e) a hang-weighing mechanism for weighing the contents of the bulk bag, wherein the bulk bag support structure is connected to said second support member through said hang-weighing mechanism;
wherein the first support member comprises a vertical beam and the second support member comprises a projecting beam having a first end and a second, end, wherein the hang-weighing mechanism comprises a single hang-weighing device through which the first end of the projecting beam is connected to the vertical beam, and wherein the second end of the projecting beam is spaced in a forward direction from the vertical beam and is connected to the filling head and the bulk bag support structure.

11. The apparatus of claim 10, wherein the projecting beam comprises a first portion which is secured to the vertical beam and a second portion which is pivotably connected to said first portion about a pivot axis located between the first and second ends of the projecting beam.

12. The apparatus of claim 11, wherein the hang weighing device comprises a load cell which is interconnected between the first and second portions of the projecting beam, wherein the load cell is located between the pivot axis and the first end of the projecting beam.

13. The apparatus of claim 12, wherein the load cell is connected between a downwardly-facing surface of the first portion of the projecting beam and an upwardly-facing surface of the second portion of the projecting beam, such that application of a downward load at the second end of the projecting beam causes pivoting of the second portion of the projecting beam and results in a corresponding load being applied to the load cell.

14. The apparatus of claim 10, further comprising:
(f) a filling head support structure to which the filling head is connected, wherein both the filling head and the filling head support structure are connected to and supported by the second support member.

15. The apparatus of claim 14, wherein the filling head support structure comprises a frame structure connected to an end of the second support member which is distal to said first support member, and wherein the filling head is rigidly secured to said frame structure.

16. The apparatus of claim 15, wherein the frame structure comprises a framework of generally horizontal members to which the filling head is secured, wherein the filling head comprises a pair of concentric cylinders separated by an annular space.

17. The apparatus of claim 15, wherein the bulk bag support structure comprises a pair of parallel hanger arms extending along either side of the filling head, and wherein the hanger arms are provided with a plurality of hangers for engaging the support elements of the bulk bag, the support elements comprising loops.

18. The apparatus of claim 10, wherein the second portion of the projecting beam has a first end connected to said hang-weighing device and a second end which is attached to said filling head.

19. The apparatus of claim 18, wherein the second end of the second portion of the projecting beam is branched and is pivotably connected along a pivot axis to opposite sides of said filling head, wherein said pivot axis extends through a center of said filling head.

20. The apparatus of claim 10, wherein the bulk bag support structure comprises four hanger arms projecting radially outwardly from said filling head in a X-shaped pattern, each of the hanger arms having a first end attached to the filling head and a second end carrying a hanger for engaging a support element of the bulk bag, wherein the support elements comprise loops.

21. The apparatus of claim 20, wherein the filling head is provided with a pair of spaced, annular flanges between which the first ends of the hanger arms are received.

22. The apparatus of claim 20, wherein two of said hanger arms are pivotably attached to said filling head for rotation about their first ends.

23. The apparatus of claim 22, wherein said two pivotable hanger arms are rotatable about their first ends from a first position in which they are each angled relative to an adjacent hanger arm to a second position in which they are each approximately parallel to an adjacent hanger arm.

24. The apparatus of claim 23, further comprising a pair of fluid-actuated cylinders for pivoting said two pivotable hanger arms, wherein each of the fluid-actuated cylinders is attached at one end to the filling head and at another end to one of the hanger arms.

25. A bulk bag filling apparatus, comprising:
(a) a first support member having an upper end and a lower end and being oriented in a generally vertical direction;
(b) a second support member connected to said generally vertical member and extending at an angle to said generally vertical direction;
(c) a filling head for engagement with an opening of the bulk bag, wherein the filling head is connected to and supported by the second support member;
(d) a bulk bag support structure for engagement with support elements of the bulk bag, wherein the bulk bag support structure is connected to and supported by the second support member; and (e) a hang-weighing mechanism for weighing the contents of the bulk bag, wherein the bulk bag support structure is connected to said second support member through said hang-weighing mechanism;

wherein the second support member is connected to the first support member so as to be movable along the first support member in said generally vertical direction;

and wherein the apparatus further comprises a drive mechanism for moving said second support member in said generally vertical direction.

26. The apparatus of claim 25, wherein the first support member comprises a vertical beam and the second support member comprises a projecting beam having a first end which is movably connected to the vertical beam and having a second end spaced in a forward direction from the vertical beam.

27. The apparatus of claim 26, wherein the projecting beam is movably connected to the vertical beam by a vertically movable sleeve surrounding the vertical beam, the sleeve having a forward-facing surface on which the first end of the projecting beam is mounted.

28. The apparatus of claim 9, wherein the angle is about 60 degrees.

29. The apparatus of claim 9, wherein the angle is about 90 degrees.

30. A bulk bag filling apparatus comprising:
(a) a first support member having an upper end and a lower end and being oriented in a generally vertical direction;
(b) a second support member connected to said generally vertical member and extending at an angle to said generally vertical direction;
(c) a filling head for engagement with an opening of the bulk bag, wherein the filling head is connected to and supported by the second support member;
(d) a bulk bag support structure for engagement with support elements of the bulk bag, wherein the bulk bag support structure is connected to and supported by the second support member; and
(e) a hang-weighing mechanism for weighing the contents of the bulk bag, wherein the bulk bag support structure is connected to said second support member through said hang-weighing mechanism;

further comprising a rotatable base on which the lower end of the first support member is mounted such that the first support member is rotatable about an axis which is parallel to said generally vertical direction.

31. The apparatus of claim 30, wherein the rotatable base comprises a turntable mechanism.

32. The apparatus of claim 30, wherein said second support member extends in a forward direction from said first support member, and wherein the apparatus further comprises:
a third support member connected to said generally vertical member and extending at an angle to said generally vertical direction and in a direction which is generally opposite to that in which the second support member extends;
a second filling head for engagement with an opening of a second bulk bag;
wherein the second filling head is connected to the third support member and are supported therefrom;
and a second bulk bag support structure for engagement with support elements of the second bulk bag, wherein the second bulk bag support structure is connected to the third support member and is supported therefrom.

* * * * *